US012323641B2

(12) United States Patent
Lin et al.

(10) Patent No.: US 12,323,641 B2
(45) Date of Patent: Jun. 3, 2025

(54) ENCODING OF LENSLET IMAGE DATA

(71) Applicant: Adeia Imaging LLC, San Jose, CA (US)

(72) Inventors: Ting-Lan Lin, Da-an District (TW); Tao Chen, Palo Alto, CA (US)

(73) Assignee: Adeia Imaging LLC, San Jose, CA (US)

(*) Notice: Subject to any disclaimer, the term of this patent is extended or adjusted under 35 U.S.C. 154(b) by 0 days.

(21) Appl. No.: 18/142,964

(22) Filed: May 3, 2023

(65) Prior Publication Data
US 2024/0373074 A1 Nov. 7, 2024

(51) Int. Cl.
*H04N 21/2343* (2011.01)
*H04N 21/4402* (2011.01)

(52) U.S. Cl.
CPC ..... *H04N 21/2343* (2013.01); *H04N 21/4402* (2013.01)

(58) Field of Classification Search
CPC .................. H04N 21/2343; H04N 21/4402
USPC .................................................. 375/240.01
See application file for complete search history.

(56) References Cited

U.S. PATENT DOCUMENTS

| | | | | |
|---|---|---|---|---|
| 6,307,974 B1* | 10/2001 | Tsujimoto | ......... | H04N 1/00204 370/465 |
| 2007/0053604 A1* | 3/2007 | Lee | ...................... | H04N 19/122 382/250 |
| 2011/0222687 A1* | 9/2011 | Mori | ..................... | H04N 7/1675 380/200 |
| 2015/0245041 A1* | 8/2015 | Ichigaya | ............... | H04N 19/513 375/240.02 |
| 2017/0026653 A1* | 1/2017 | Xie | ........................ | H04N 19/176 |
| 2017/0085884 A1* | 3/2017 | Kulkarni | ............... | H04N 19/86 |
| 2017/0221234 A1* | 8/2017 | Chen | ......................... | G06T 5/50 |
| 2017/0284867 A1* | 10/2017 | Gensemer | ............. | G01J 3/0221 |
| 2018/0164229 A1* | 6/2018 | Pisarenco | ........... | G03F 7/70625 |
| 2020/0411016 A1* | 12/2020 | Sugiura | ............... | H03M 7/6005 |
| 2021/0333385 A1* | 10/2021 | Rohani | ................... | G01S 13/87 |
| 2022/0147595 A1* | 5/2022 | Schwartz | ................ | G06F 17/16 |
| 2022/0377374 A1* | 11/2022 | Da Silva | .............. | H04N 19/593 |
| 2022/0377377 A1* | 11/2022 | Budagavi | ............. | H04N 19/176 |
| 2024/0105045 A1* | 3/2024 | Hammer | ................ | G06V 20/52 |

OTHER PUBLICATIONS

Batselier et al. ("A Constructive Arbitrary-Degree Kronecker Product Decomposition of Tensors," 2016) (Year: 2016).*
"Holovizio display system," [retrieved from URL: http://www.holografika.com/] (11 pages).

(Continued)

Primary Examiner — Matthew David Kim
(74) Attorney, Agent, or Firm — Haley Guiliano LLP

(57) ABSTRACT

Systems, methods and apparatuses are described herein for accessing image data that comprises a plurality of macropixels, wherein the image data may be generated using a device comprising a lenslet array. The image data may be decomposed into a plurality of components using Kronecker product singular value decomposition (KP-SVD). Each component of the plurality of components may be encoded. Each encoded component of the plurality of components may be transmitted to cause display of reconstructed image data based on decoding each encoded component of the plurality of components.

20 Claims, 15 Drawing Sheets

(56) References Cited

OTHER PUBLICATIONS

"Lytro Archive," [retrieved from URL: http://lightfield-forum.com/lytro/lytro-archive/] (11 pages).

"Overview of JPEG Pleno," [retrieved from URL: https://jpeg.org/jpegpleno/] (2 pages).

Arai, J., et al., "Integral three-dimensional television with video system using pixel-offset method," Opt. Express, 21(3):3474-3485 (2013).

Batselier, K., et al., "A constructive arbitrary-degree Kronecker product decomposition of tensors," Numerical Linear Algebra with Applications, 24 (2017).

Conti, C., et al., "Dense light field coding: a survey," IEEE Access, 8:49244-49284 (2020).

De Carvalho, M.B., et al., "A 4D DCT-based lenslet light field codec," IEEE International Conference on Image Processing (ICIP), 435-439 (2018).

Huu, T. N., et al., "Fast and efficient microlens-based motion search for plenoptic video coding," IEEE International Conference on Image Processing (ICIP), 3258-3262 (2021).

Li, L., et al., "Pseudo-sequence-based 2-D hierarchical coding structure for light-field image compression," IEEE Journal of Selected Topics in Signal Processing, 11(7):1107-1119 (2017).

Monteiro, R., et al., "Light field image coding: objective performance assessment of Lenslet and 4D LF data representations," Proc. SPIE, 10752:Art. No. 107520D (2018).

Omura, T., et al., "Full-parallax 3D display using time-multiplexing projection technology," IS&T International Symposium on Electronic Imaging, SD&A 100, 100.1-100.5 (2020).

Raghavendra, R., et al., "Presentation attack detection for face recognition using light field camera," IEEE Trans. Image Process., 24(3): 1060-1075 (2015).

Shin, D., et al., "Three-dimensional optical microscopy using axially distributed image sensing," Optics Letters, 35(21):3646-3648 (2010).

Van Loan, C. F., et al., "Approximation with Kronecker Products, in linear algebra for large scale and real time applications," Kluwer Publications, 293-314 (1993).

Wang, J., et al., "Augmented reality 3D displays with micro integral imaging," J. Display Technol., 11(11):889-893 (2015).

\* cited by examiner

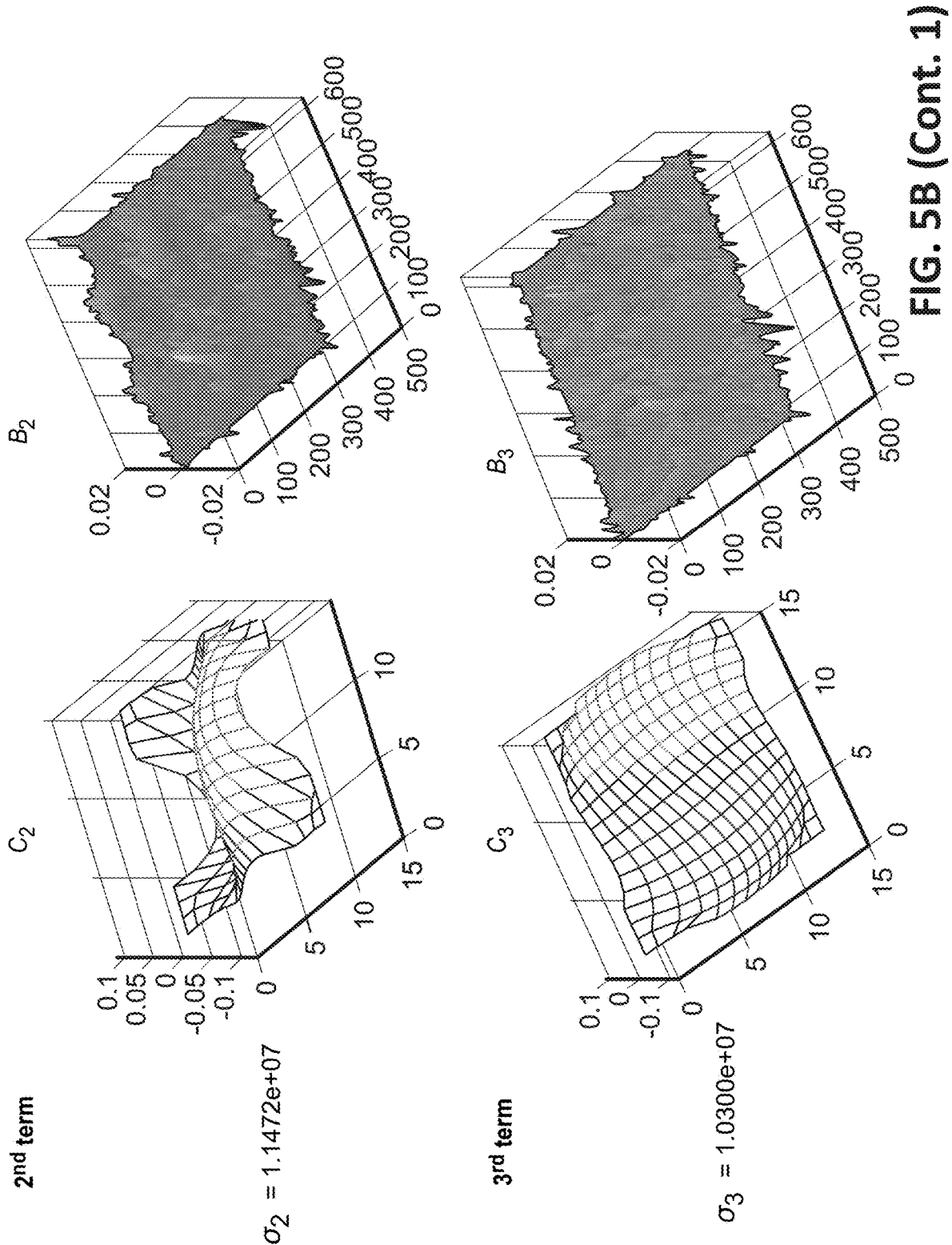
FIG. 5B (Cont. 1)

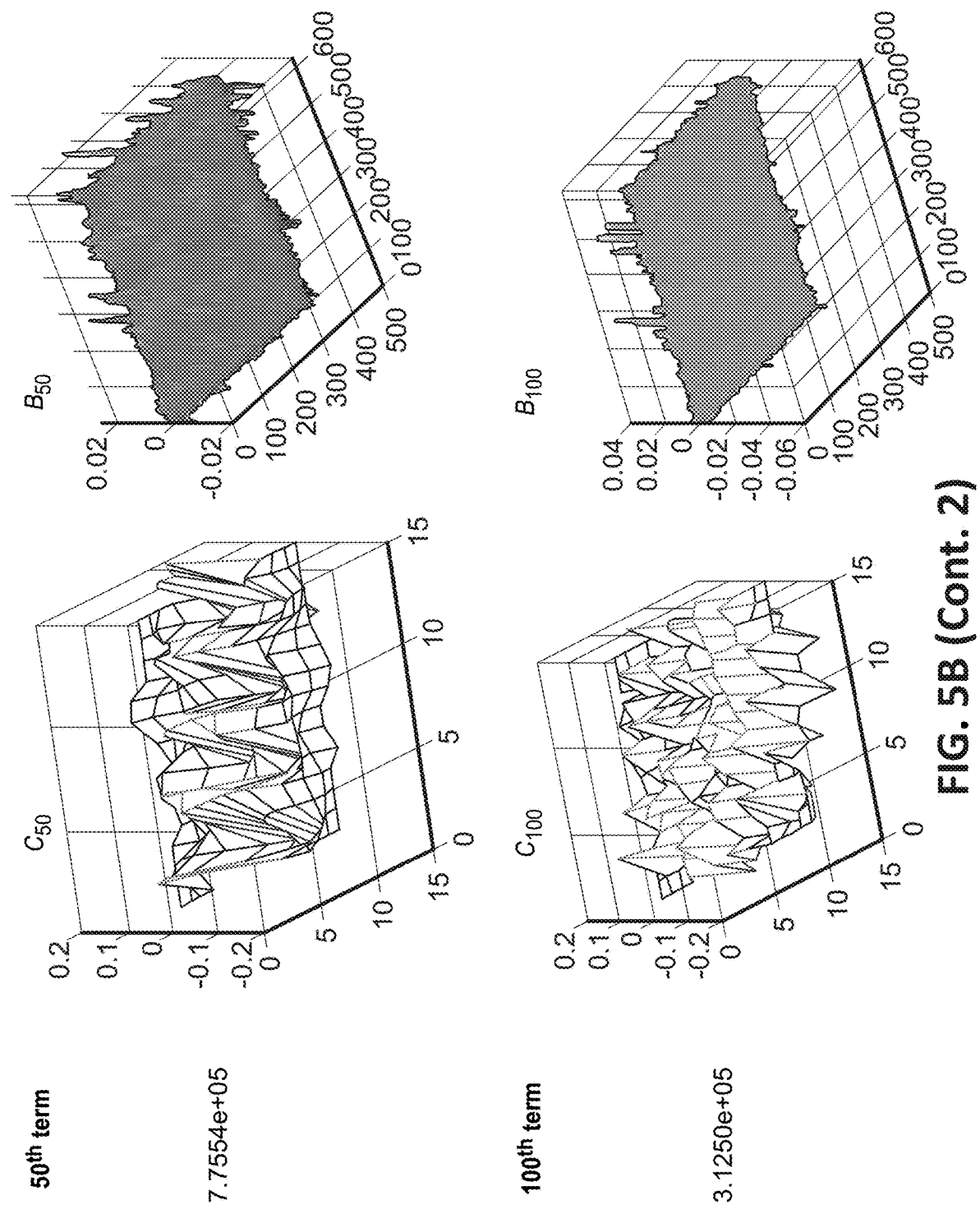
FIG. 5B (Cont. 2)

ENCODING OF LENSLET IMAGE DATA

FIELD OF THE DISCLOSURE

This disclosure is directed to systems and methods for encoding image data. In particular, the image data may comprise a plurality of macropixels, and the image data may be generated using a device comprising a lenslet array. The image data may be decomposed using Kronecker product singular value decomposition (KP-SVD) into a plurality of components, and each of such components may be encoded.

BACKGROUND

With recent advances in display technology, image sensor technology and computation, particularly graphics processing units (GPUs), as well as increasing interest in immersive virtual experiences, the long-pursued concept of light field displays is becoming a more active area of commercial development. Light field (LF) is a three-dimensional (3D) capture solution that directly records four-dimensional (4D) plenoptic visual signals for immersive visual communication and interaction. Due to the highly redundant nature of LF data, the data volume generated is extremely large (e.g., including many high-resolution views) for storage and communication of LF data.

Lenslet image capturing and rendering has shown potential for applications such as LF, virtual reality (VR) and augmented reality (AR), cinematography, 3D television, biometric recognition, and medical imaging. A lenslet image may be acquired by placing a microlens array in front of a sensor of a traditional camera, so that the image can contain the light rays from different directions, allowing the end user to reconstruct the scene from various perspectives.

The large amount of information for LF data, such as lenslet image data, results in a large size of the image data, due to spatial information representing various different perspectives and angular positions of a captured scene. Thus, development of techniques for the compression of such data is being pursued. Further, compression of lenslet images presents unique challenges due to a macropixel structure of such images that is induced by the lenslet arrays.

In one approach for compression of lenslet images, lenslet images are transformed into a full parallax multi-view format using a series of pixel manipulations such as resampling, rotation, scaling, transforming and slicing. The converted representation of multiple sub-views, or SAIs (sub-aperture images), each represents an angular view that one of the microlenses captures. The SAIs can be cascaded into a pseudo video sequence, which then can be compressed using Joint Photographic Experts Group (JPEG) or high efficiency video coding (HEVC) techniques, for example. However, this may involve challenging and sophisticated processes, particularly when a set of high quality SAIs is desired. In addition to added complexity, in some circumstances, this approach may introduce quality degradation, since some of these processes are non-invertible, and information loss may be undesirable where the rendering and display of LF data or other data relies on raw representation of lenslet images.

In another approach, lenslet images can be directly compressed using a codec specifically designed for lenslet images. However, such an approach involves implementation of such specifically designed codec into software and/or hardware systems of an encoder and decoder software and/or hardware systems in the encoder and decoder, and it may be burdensome and expensive to supplement existing systems with such specifically designed codec.

SUMMARY

To help overcome these drawbacks, the present disclosure provides apparatuses, systems and methods for accessing image data that comprises a plurality of macropixels, wherein the image data is generated using a device comprising a lenslet array. Implementing any of the one or more of the techniques described herein, a system or systems may decompose the image data into a plurality of components using Kronecker product singular value decomposition (KP-SVD), and encode each component of the plurality of components. The system(s) may transmit each encoded component of the plurality of components to cause display of reconstructed image data based on decoding each encoded component of the plurality of components.

Such aspects may enable implementation of an encoder that directly encodes a lenslet image, e.g., into a bitstream, which can be decoded (e.g., by a decoder at a client device) to reconstruct the lenslet image. In such a system, the raw representation of the lenslet image does not have to be explicitly converted to multi-view or SAIs, which may eliminate possible information loss in conversion and also reduce the computational complexity in pre-processing for compression of lenslet images. Moreover, the decomposition and reconstruction processes may be invertible, e.g., to minimize degradation of picture quality when reconstructing an encoded lenslet image. The KP-SVD operation may be used to decompose the lenslet image, which may take advantage of the consistent structure between such decomposition process and the lenslet image, e.g., where a size of one or more matrixes employed in the KP-SVD operation may correspond to a resolution associated with the macropixel structure intrinsic to the lenslet image, without requiring complex conversions or complex pre-processing of the lenslet image. The techniques described herein can provide scalability and better rate-distortion performance as compared with other approaches.

In some embodiments, each component of the plurality of components is determined based on the number of the plurality of macropixels included in the image data and the dimensions of each of the plurality of macropixels.

In some embodiments, each respective component of the plurality of components comprises a first sub-component and a second sub-component. In some embodiments, decomposing the image data into the plurality of components using KP-SVD further comprises, for each respective component of the plurality of components, determining a first matrix corresponding to the first sub-component, wherein a size of the first matrix is determined based on the number of the plurality of macropixels included in the image data; and determining a second matrix corresponding to the second sub-component, wherein a size of the second matrix is determined based on the dimensions of each of the plurality of macropixels. In some embodiments, encoding each component of the plurality of components further comprises, for each respective component, encoding the first sub-component and encoding the second sub-component.

In some embodiments, the first matrix is larger than the second matrix, and encoding each component of the plurality of components further comprises encoding the first sub-component using a first encoding technique corresponding to an image codec, and encoding the second sub-component using a second encoding technique different from the first encoding technique. For example, the first sub-component may correspond to a natural image representation of the lenslet image, which may be spatially continuous and allow for use of an existing image codec in encoding the first sub-component. In some embodiments, the first sub-component may correspond to a weighting factor to be applied to the first sub-component, and/or may be encoded using a technique different from the first encoding technique (e.g., fixed length coding or any other suitable technique).

In some embodiments, prior to encoding the first sub-component, the methods, systems and apparatuses provided herein may normalize the first sub-component using a set of normalization parameters; wherein transmitting for display each encoded component of the plurality of components further comprises transmitting the set of normalization parameters.

In some embodiments, the decomposition and reconstruction may be performed in a progressive manner with a series of Kronecker products, e.g., by sending partial information to the decoder. This may provide flexibility in adaptive streaming where a single stream or inventory may serve multiple targets. In some embodiments, the quality control and management in encoding production can be optimized through an efficient prediction of target bitrates and desired quality levels. For example, after decomposition, a parameter g may be set to transmit/save only the first g components or terms, under the consideration of the required image quality and the bit budgets in different applications.

For example, the methods, systems and apparatuses provided herein may decompose the image data into one or more additional components in addition to the plurality of components and encode each of the one or more additional components. The transmitting each encoded component of the plurality of components may be performed based on determining that current network conditions permit the transmitting for display of each encoded component of the plurality of components, but do not permit the transmitting for display of each of the one or more additional encoded components. In response to determining that the current network conditions have improved sufficiently enough to permit transmission of the one or more additional encoded components, the one or more additional encoded components may be transmitted. As another example, after transmitting for display each encoded component of the plurality of components, the methods, systems and apparatuses provided herein may receive a request for a higher-quality version of the image data. In response to receiving the request, such one or more additional encoded components may be transmitted. Such additional encoded component(s) may be added to the prior reconstruction (e.g., using the g components) without having to re-send the initial g components. On the other hand, in such a circumstance, other approaches generally require the whole image to be encoded again with other settings.

In some embodiments, the plurality of components corresponds to respective different frequency values associated with the image data, and each encoded component of the plurality of components is transmitted in a sequential order of ascending frequency values.

In some embodiments, each encoded component of the plurality of components is transmitted to a client device; the client device is configured to perform the decoding of each encoded component of the plurality of components, and generating for display the reconstructed image data; and the reconstructed image data is generated for display by aggregating the plurality of components at the client device, e.g., to increase the image quality.

In some embodiments, the present disclosure provides for a non-transitory computer-readable medium having non-transitory computer-readable instructions encoded thereon that, when executed by control circuitry, cause the control circuitry to access image data that comprises a plurality of macropixels, wherein the image data is generated using a device comprising a lenslet array; decompose the image data into a plurality of components using Kronecker product singular value decomposition (KP-SVD); encode each component of the plurality of components; and transmit each encoded component of the plurality of components to cause display of reconstructed image data based on decoding each encoded component of the plurality of components.

In some embodiments, the present disclosure provides for means for accessing image data that comprises a plurality of macropixels, wherein the image data is generated using a device comprising a lenslet array; means for decomposing the image data into a plurality of components using Kronecker product singular value decomposition (KP-SVD); means for encoding each component of the plurality of components; and means for transmitting each encoded component of the plurality of components to cause display of reconstructed image data based on decoding each encoded component of the plurality of components.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
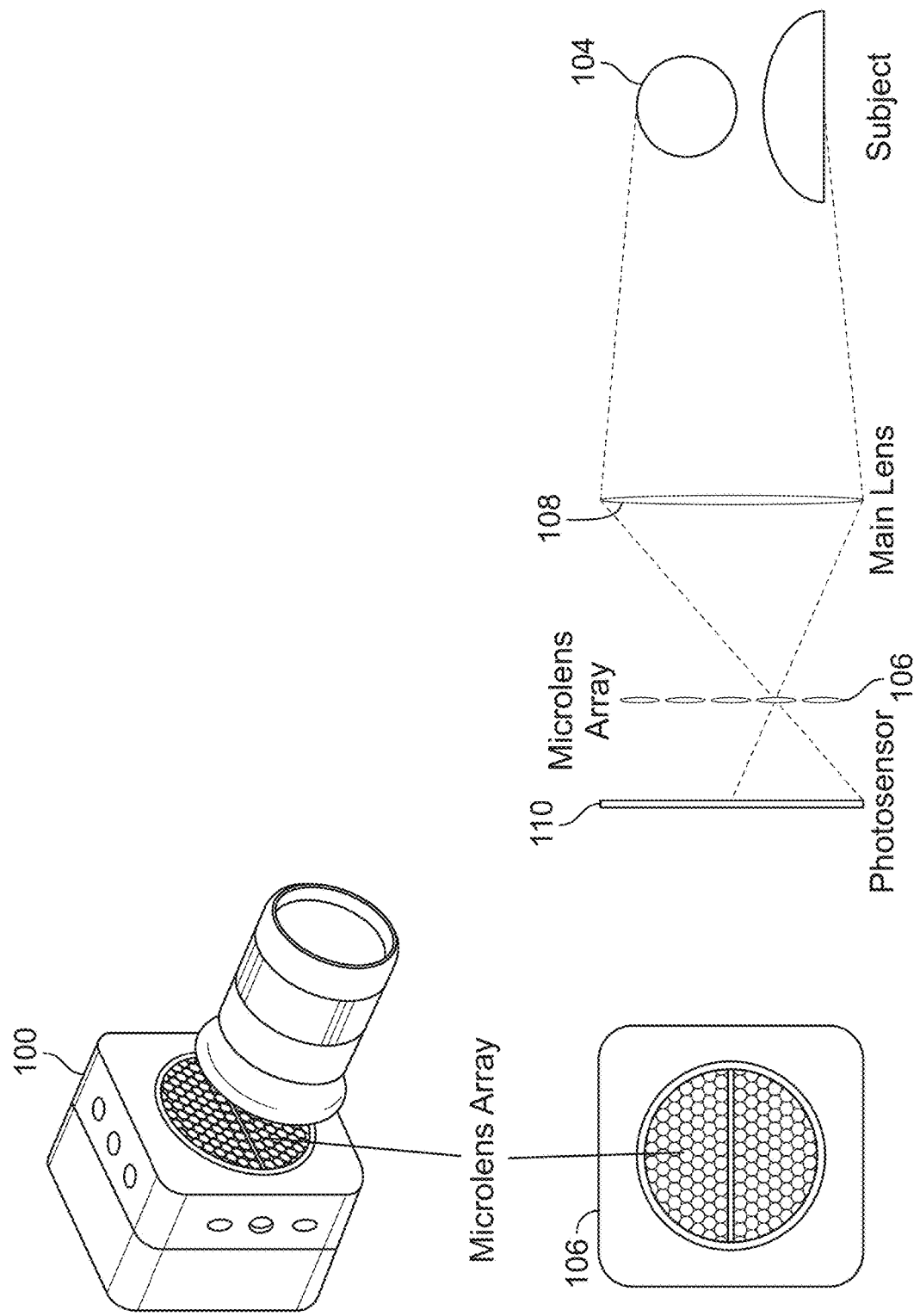
FIG. 1 shows a device for capturing and/or generating a lenslet image, in accordance with some embodiments of this disclosure.

FIG. 1 shows a device for capturing and/or generating a lenslet image, in accordance with some embodiments of this disclosure. The apparatuses, systems and methods described herein may implement an image data processing system (e.g., implemented at one or more of device 100 of FIG. 1; encoder 312 and decoder 314 of FIGS. 3 and 6; devices 800 and 801 of FIG. 8; media content source 902, server 904, database 905, or devices 907, 908, and 915 of FIGS. 9A-9B, or any combination thereof, or distributed across one or more of any other suitable computational resources; or any combination thereof).

The image data processing system may (e.g., at least in part using device 100, which may correspond to or include a camera) be configured to capture image data depicting one or more objects or subjects 104. Device 100 may comprise microlens or lenslet array 106 which may correspond to a one-dimensional (1D) or two-dimensional (2D) array of microlenses or lenslets. Device 100 may comprise, or otherwise be in proximity to, any suitable number or types of lenses, e.g., a main lens or depth control lens 108 and photosensor 110, which may correspond to a charge-coupled device (CCD) and/or a complementary metal-oxide semiconductor (CMOS) image sensor.

In some embodiments, the captured image data may correspond to light field (LF) lenslet images, or may correspond to any other suitable imagery. In some embodiments, LF or plenoptic image data may represent a scene as a collection of observations of the natural scene from different camera or image sensor positions or different perspectives or angular positions to enable reconstruction of the captured scene from such different positions, perspectives, or angles of the scene. In some embodiments, the LF image data may correspond at least in part to synthetic content such as from a 3D model or game engine, and may be rendered with a virtual camera in an array of positions to enable reconstruction of the captured scene from such different positions, perspectives, or angles of the scene. Device 100, lenslet array 106, main lens 108 and/or photosensor 110 may correspond to or include one or more plenoptic content capture devices, or any other suitable content capture devices or cameras, or any combination thereof, which may each comprise internal microlens arrays and image sensors.

As shown in FIG. 1, the placement of microlens or lenslet array 106 in front of photosensor 110 may enable the captured image data to be generated based on light rays received from various directions, allowing reconstruction of the scene from a variety of angular perspectives and/or depths. For example, each lenslet in the array may be used to capture image data from a different perspective of subject 104. LF information comprising all light rays or photons propagating from subject 104 to device 100 may be captured as the image data. Such LF information is four-dimensional, and may be represented by a vector comprising intensity information, spatial positioning information, and directionality and angular information of light rays of the LF.

In some embodiments, light rays from a particular portion of the captured scene (e.g., including subject 104) may project to a particular portion of lenslet array 106 (e.g., via main lens 108) and/or to corresponding portions or pixels of photosensor 110 (e.g., positioned behind lenslet array 106, such as, for example, in device 100). Such features may enable preserving orientation and direction information of the light rays arriving at the sensor, in addition to color and brightness information, for use in reconstructing the image data at a 2D or 3D display.

Figure 2A:
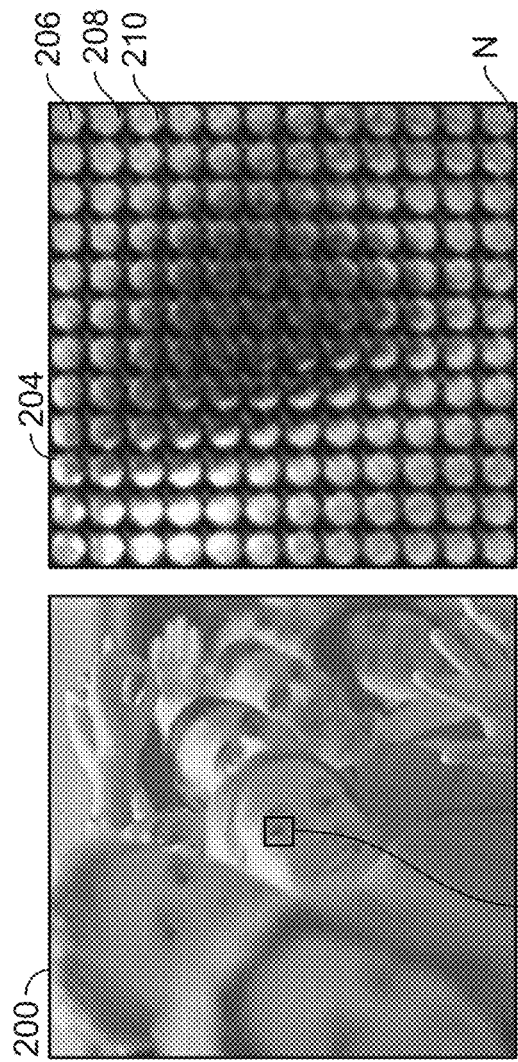
FIGS. 2A-2B show an illustrative lenslet image, in accordance with some embodiments of this disclosure.
Figure 2B:
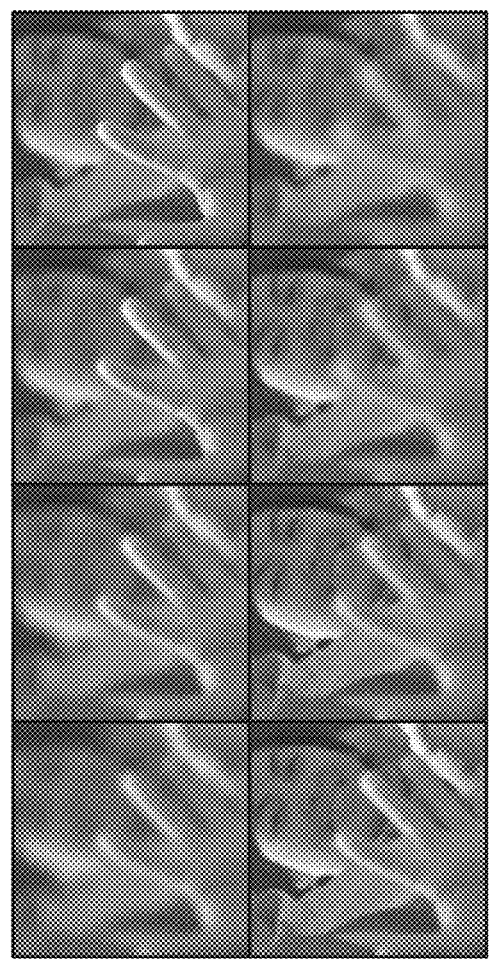

FIGS. 2A-2B show an illustrative lenslet image, in accordance with some embodiments of this disclosure. Lenslet image 200 may be captured and generated by one or more components of the image data processing system. In the example of FIG. 2A, image portion 204 represents a magnified, more detailed view of portion 202 of lenslet image 200. Lenslet array 106 may comprise any suitable number of lenslets, placed behind main lens 108 in relation to subject 104 (e.g., lenslet array 106 being positioned in between main lens 108 and photosensor 110) to capture incoming light rays and generate image data in a lenslet format comprising any suitable number of macropixels 206, 208, 210 . . . . N of lenslet image 200. Such structure of macropixels 206, 208, 210 . . . . N may be induced by lenslet array 106.

The incoming light rays may converge on different portions of lenslet array 106 and diverge to corresponding portions of image sensor 110 for output as macropixels 206, 208, 210 . . . . N, e.g., a group of pixels. Such macropixels may enable diverse angular views of a scene to be captured and enable post-processing of image data, e.g., re-focusing (or other interaction with spatial features of the image data), as shown in FIG. 2B, of discretized light field captured in raw lenslet image 200 based on the depths of objects or portions thereof in lenslet image 200. In some embodiments, at least a portion of the macropixels of lenslet image 200 may have a hexagonal form or any other suitable shape(s), and may comprise or otherwise indicate LF information for the micropixel. In some embodiments, the optical structure and architecture of the lenslet arrangement of lenslet array 106 may determine the size of the macropixels, as discussed in more detail in application Ser. No. 17/734,611, filed May 2, 2022, in the name of Rovi Guides, Inc., the contents of which are hereby incorporated by reference herein in their entirety.

Figure 8:
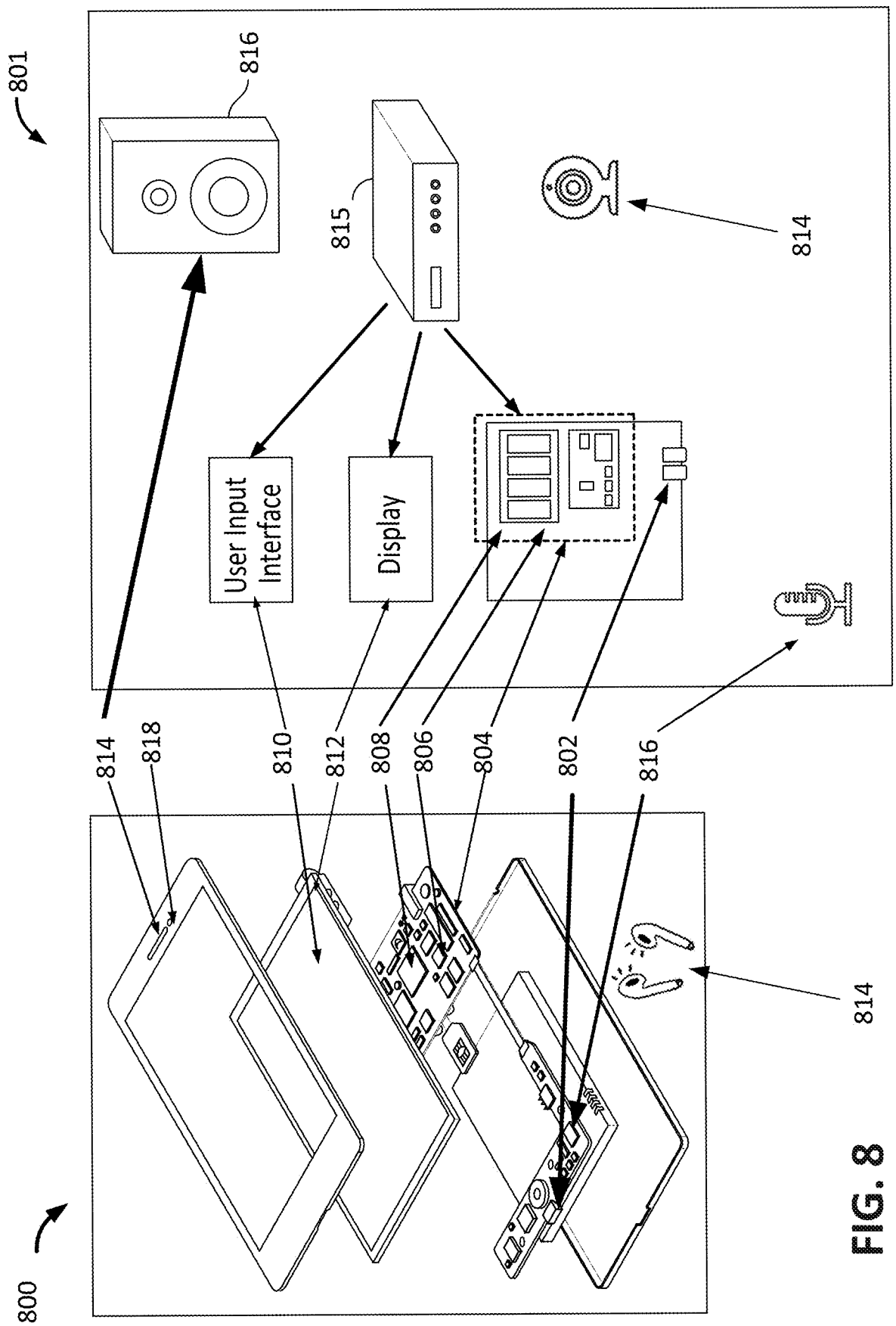
FIGS. 8, 9A and 9B show illustrative devices and systems for encoding image data, in accordance with some embodiments of this disclosure.
Figure 9A:
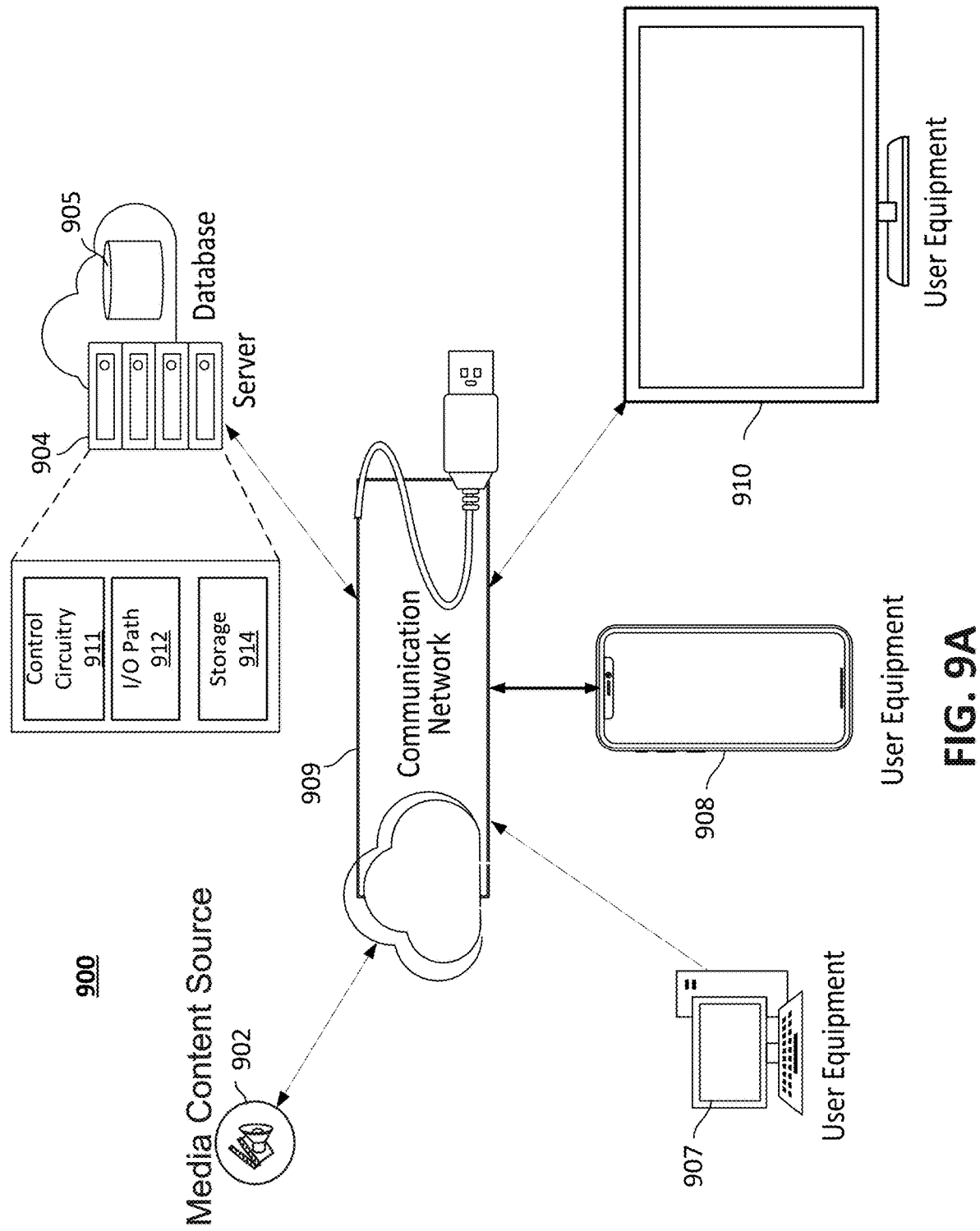

In some embodiments, the image data processing system may access lenslet image data (e.g., lenslet image 200) over a network (e.g., communication network 909 of FIG. 9A or any other suitable network) stored at, for example, media content source 902 and/or server 904 of FIG. 9A; from a website or application or any other suitable data source; or from any combination thereof. Additionally or alternatively, the image data processing system may access one or more of the images by capturing and/or generating the images, and/or retrieving the images from memory (e.g., memory or storage of device 907, 908, 910 of FIG. 9A, or memory or storage 914 of server 904 or database 905, or any other suitable data store, or any combination thereof) and/or receiving the images over any suitable data interface, or by accessing the images using any other suitable methodology, or any combination thereof. In some embodiments, the image data processing system may be configured to access, and/or perform processing on, output or transmit, the images at least in part based on receiving a user input or a user request, e.g., via user input interface 810 of FIG. 8 and/or I/O circuitry of display device 915 of FIG. 9B.

In some embodiments, the accessed lenslet image data may each or respectively correspond to a photo, a picture, a still image, a live photo, a video, a movie, a media asset, a screenshot of a media asset, a recording, a slow motion video, a panorama photo, a GIF, burst mode images, multi-exposure extended or high dynamic range (HDR) image capture, images from another type of mode, or any other suitable image, or any combination thereof. As referred to herein, the terms "media asset" and "content" may be understood to mean electronically consumable user assets, such as LF content, 3D content, television programming, as well as pay-per-view programs, on-demand programs (as in video-on-demand (VOD) systems), live content, Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by user equipment devices, and/or can be part of a live performance.

Figure 3:
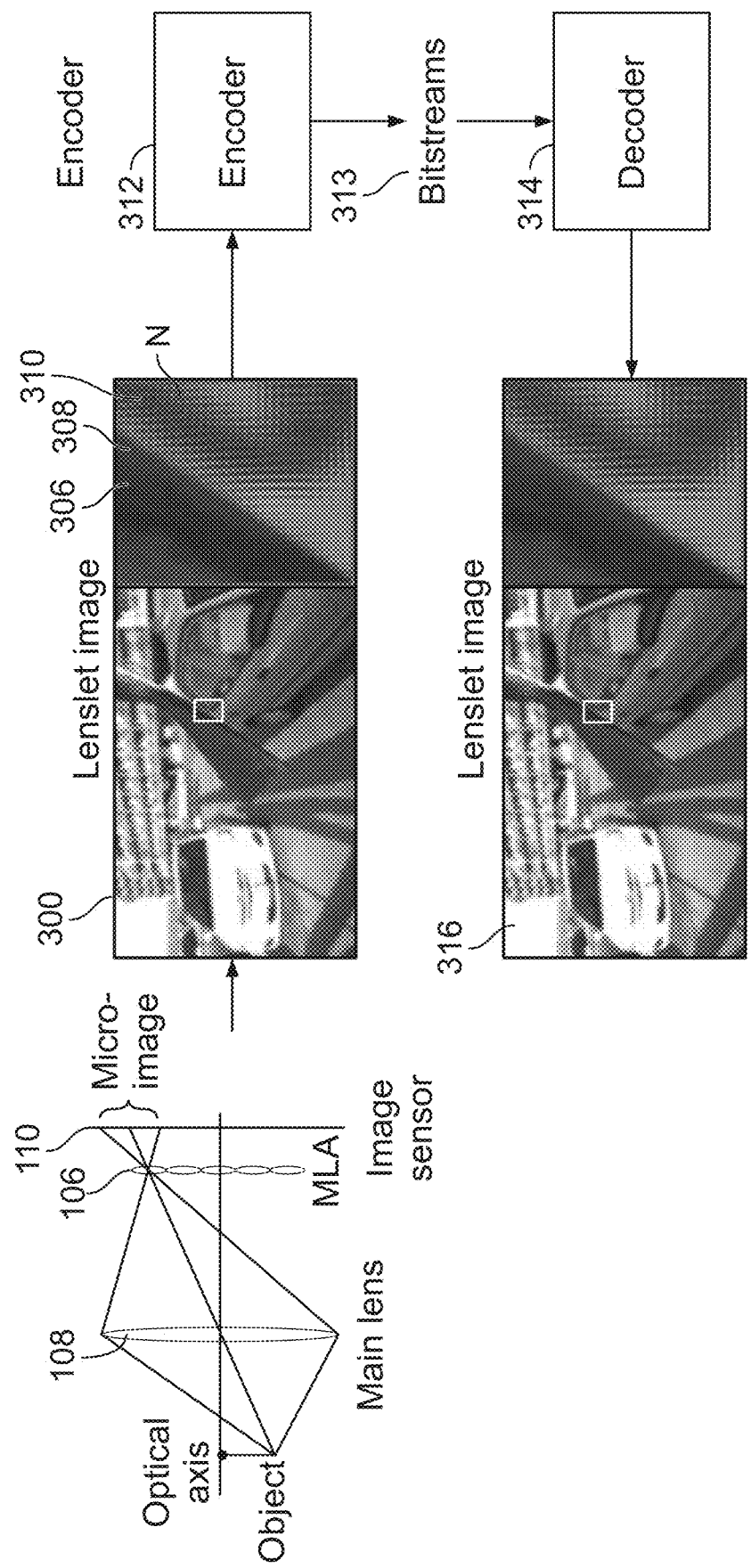
FIG. 3 shows an illustrative flowchart for encoding lenslet image 300, in accordance with some embodiments of this disclosure.

FIG. 3 shows an illustrative flowchart for encoding lenslet image 300, in accordance with some embodiments of this disclosure. Lenslet image 300 may be a raw lenslet image comprising any suitable number of macropixels, e.g., a plurality of macropixels 306, 308, 310, . . . . N, and such structure may be induced by microlens array 106. The image data processing system described herein may be configured to directly operate on image data corresponding to such a raw lenslet image to encode (e.g., using encoder 312) the lenslet image data. For example, the image data processing system may employ a Kronecker product singular value decomposition (KP-SVD) operation (shown at 404 of FIG. 4B) to decompose an input lenslet image, such as, for example, raw lenslet image 300. In some embodiments, the KP-SVD operation may be considered as part of the encoding of the lenslet image, or may be considered a pre-processing step to, or otherwise distinct from, the encoding of the lenslet image. The image data processing system may include decoder 314 to receive and decode the image data encoded by encoder 312, to obtain a reconstruction 316 of the lenslet image data. The Kronecker product is discussed in more detail in Loan et al., "Approximation with Kronecker Products, in linear algebra for large scale and real time applications," Kluwer Publications, pp. 293-314, 1993, the contents of which are hereby incorporated by reference herein in their entirety.

As referred to herein, compression and/or encoding of image data corresponding to a lenslet image may be understood as performance (e.g., by the image data processing system, using any suitable combination of hardware and/or software) of bit reduction techniques on digital bits of the image data in order to reduce the amount of storage space required to store the at least a portion of a media asset. Such techniques may reduce the bandwidth or network resources required to transmit the image data over a network or other suitable wireless or wired communication medium and/or enable bitrate savings with respect to downloading or uploading the image data. Such techniques may encode the at least a portion of the image data such that the encoded image data or encoded portion thereof may be represented with fewer digital bits than the original representation while minimizing the impact of the encoding or compression on the quality of the image data.

Figure 4A:
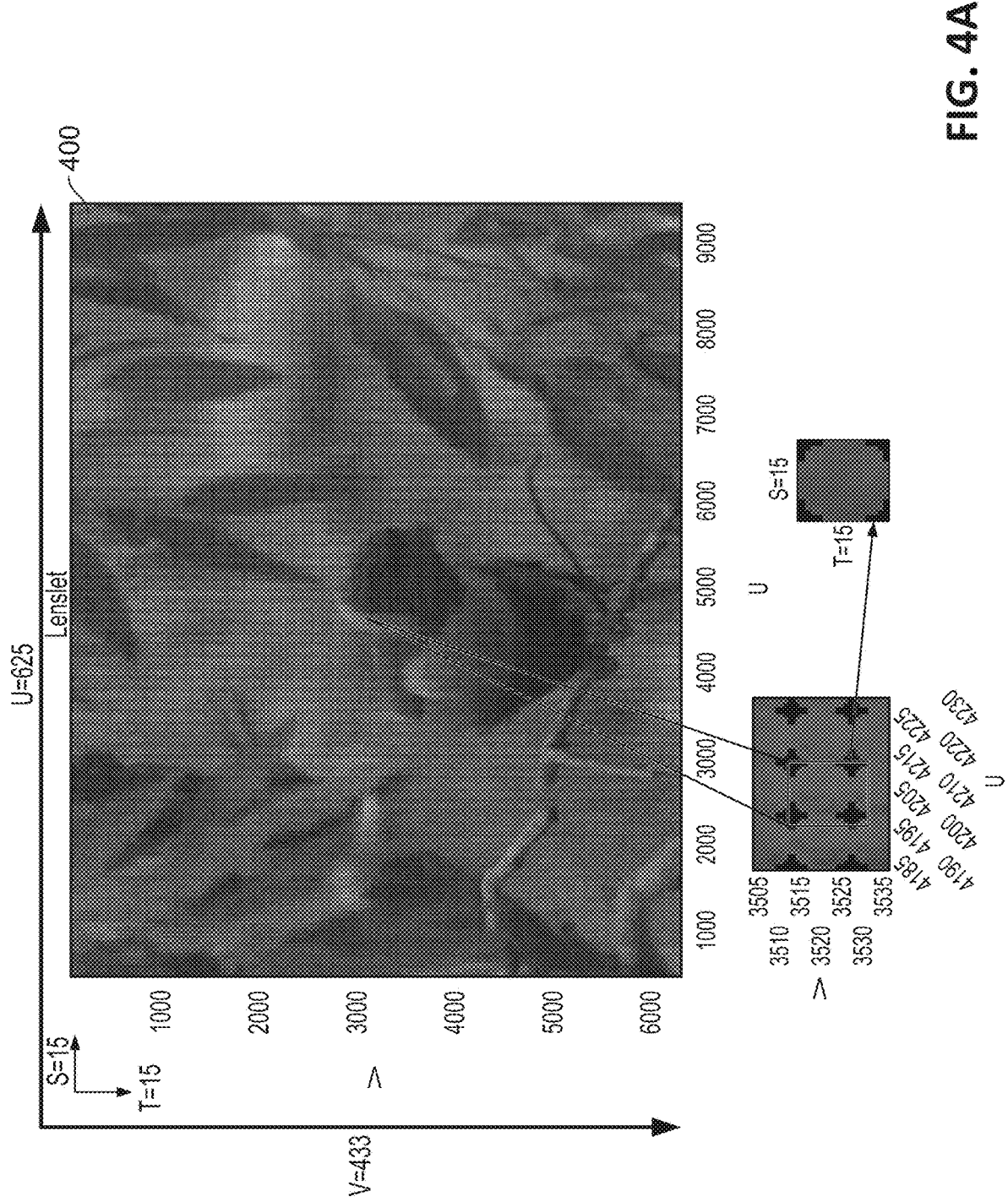
FIG. 4A shows an illustrative lenslet image, in accordance with some embodiments of this disclosure.

FIG. 4A shows an illustrative lenslet image 400, in accordance with some embodiments of this disclosure. Lenslet image 400 may comprise V×U macropixels, where each macropixel 402 may comprise T×S pixels, and therefore the dimensions of lenslet image 400 may correspond to (T*V)× (S*U). As a non-limiting example, in FIG. 4, the values for V, U, T and S may be as follows: V=433; U=625; T=15; and S=15. In some embodiments, macropixels of lenslet image 400 may each be of the same size, or one or more of the macropixels may be of a different size than other of the macropixels. While KP-SVD is discussed in the example of FIG. 4A-4B, in some embodiments, any other suitable decomposition techniques can be additionally or alternatively used, e.g., principal component analysis (PCA), non-negative matrix factorization (NMF), linear Discriminant analysis (LDA), generalized discriminant analysis (GDA), t-distributed Stochastic Neighbor Embedding (t-SNE), multidimensional scaling (MDS), machine learning techniques, or any other suitable computer-implemented technique, or any combination thereof.

Figure 4B:
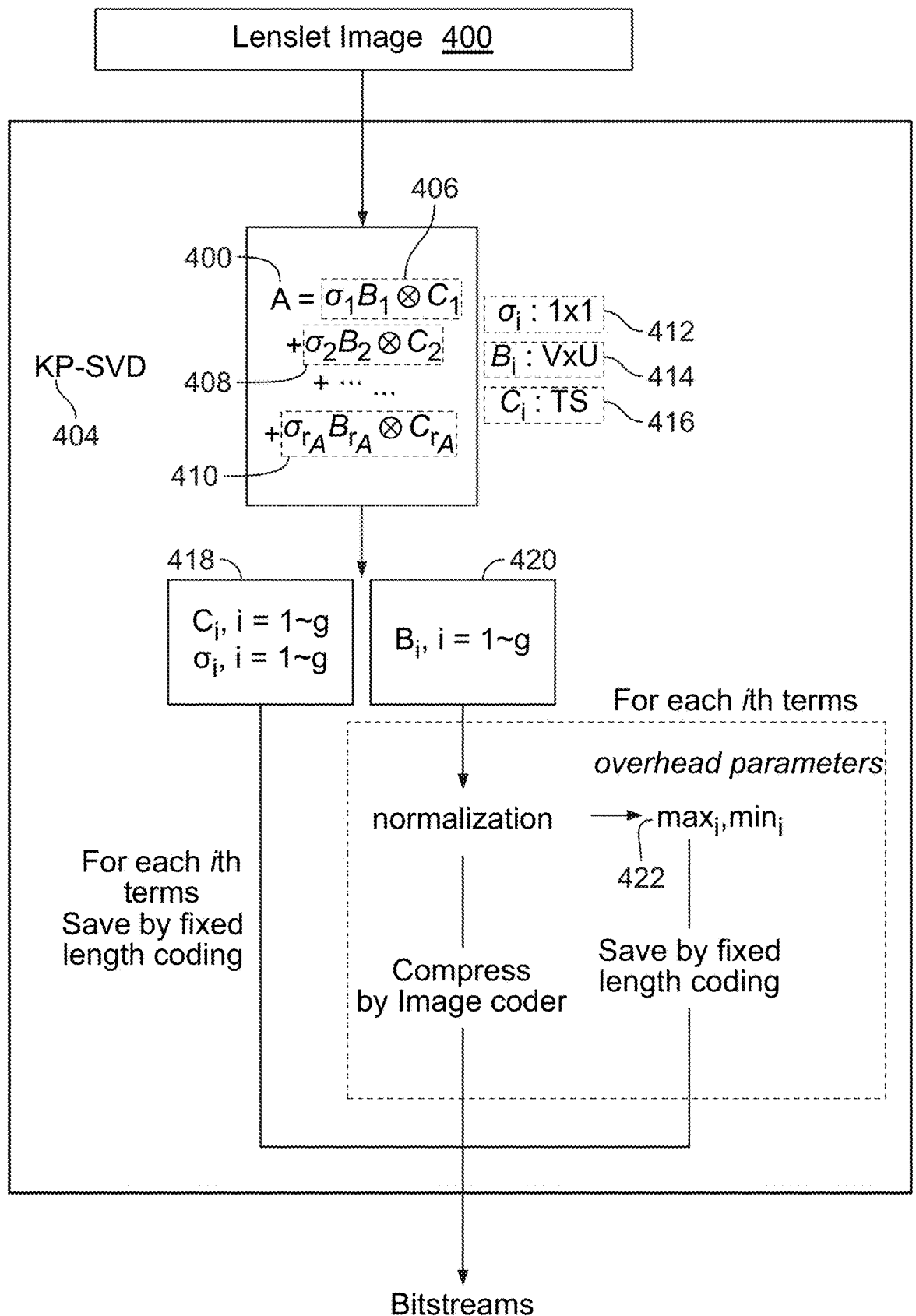
FIG. 4B shows an illustrative technique for decomposing and encoding a lenslet image, in accordance with some embodiments of this disclosure.

FIG. 4B shows an illustrative technique for decomposing and encoding a lenslet image, in accordance with some embodiments of this disclosure. Image data corresponding to lenslet image 400 may be input to the image data processing system, and the image data processing system may use an KP-SVD operation 404 to decompose the input image data (denoted as A), corresponding to the lenslet image 400, into a plurality of components 406, 408, . . . 410 (e.g., $\sigma_1 B_1 \otimes C_1$; $\sigma_2 B_2 \otimes C_2$ . . . $\sigma_{rA} B_{rA} \otimes C_{rA}$, respectively). Each of components 406, 408, . . . 410 may respectively comprise a plurality of sub-components 412, 414 and/or 416 (e.g., $\sigma_i$; $B_i$; and/or $C_i$, respectively). As shown in FIG. 4B, $\otimes$ denotes KP-SVD operation 404; $r_A$ denotes the number of significant terms or components 406, 408, . . . 410; $\sigma$ corresponds to a 1×1 matrix; and $\sigma_1 > \sigma_2 > \ldots > \sigma_{rA}$ may correspond constant variables In some embodiments, one or more pre-processing techniques (e.g., devignetting and/or any other suitable pre-processing) may be performed on the lenslet image data, prior to performing the KP-SVD operation 404.

In the KP-SVD operation 404, if A is an m×n matrix and B is a p×q matrix, then the Kronecker product A⊗B is a pm×qn block matrix:

$$A \otimes B = \begin{bmatrix} a_{11}B & \cdots & a_{1n}B \\ \vdots & \ddots & \vdots \\ a_{m1}B & \cdots & a_{mn}B \end{bmatrix};$$

which corresponds to:

$$A \otimes B = \begin{bmatrix} a_{11}b_{11} & a_{11}b_{12} & \cdots & a_{11}b_{1q} & \cdots & \cdots & a_{1n}b_{11} & a_{1n}b_{12} & \cdots & a_{1n}b_{1q} \\ a_{11}b_{21} & a_{11}b_{22} & \cdots & a_{11}b_{2q} & \cdots & \cdots & a_{1n}b_{21} & a_{1n}b_{22} & \cdots & a_{1n}b_{2q} \\ \vdots & \vdots & \ddots & \vdots & & & \vdots & \vdots & \ddots & \vdots \\ a_{11}b_{p1} & a_{11}b_{p2} & \cdots & a_{11}b_{pq} & \cdots & \cdots & a_{1n}b_{p1} & a_{1n}b_{p2} & \cdots & a_{1n}b_{pq} \\ \vdots & \vdots & & \vdots & \ddots & & \vdots & \vdots & & \vdots \\ a_{m1}b_{11} & a_{m1}b_{12} & \cdots & a_{m1}b_{1q} & \cdots & \cdots & a_{mn}b_{11} & a_{mn}b_{12} & \cdots & a_{mn}b_{1q} \\ a_{m1}b_{21} & a_{m1}b_{22} & \cdots & a_{m1}b_{2q} & \cdots & \cdots & a_{mn}b_{21} & a_{mn}b_{22} & \cdots & a_{mn}b_{2q} \\ \vdots & \vdots & \ddots & \vdots & & & \vdots & \vdots & \ddots & \vdots \\ a_{m1}b_{p1} & a_{m1}b_{p2} & \cdots & a_{m1}b_{pq} & \cdots & \cdots & a_{mn}b_{p1} & a_{mn}b_{p2} & \cdots & a_{mn}b_{pq} \end{bmatrix}.$$

As shown below, the image data processing system may use KP-SVD 404 to decompose the lenslet image into a plurality of components 406, 408, . . . 410, e.g., as a sum of finite terms with minor differences, where each component or term is a Kronecker product between two matrixes (e.g., Kronecker factors $B_k$ and $C_k$) weighted by a constant variable ($\sigma$). The trace of a matrix A denotes the sum of the elements on the main diagonal of matrix A, where the sum of the eigenvalues of matrix A equals the trace of matrix A.

If $$A = \begin{bmatrix} A_{11} & \cdots & A_{1N} \\ \vdots & \ddots & \vdots \\ A_{M1} & \cdots & A_{MN} \end{bmatrix} A_{ij} \in IR^{p \times q}$$

then there exists a positive integer $r_A$ with $r_A \leq MN$ so that $$A = \sum_{k=1}^{r_A} \sigma_k B_k \otimes C_k$$

$$r_A = \text{rank}_{KP}(A)$$

The KP-singular values: $\sigma_1 \geq \ldots \geq \sigma_{r_A} > 0$.
The $B_k \in \mathrm{IR}^{M \times N}$ and $C_k \in \mathrm{IR}^{p \times q}$ satisfy $<B_i, B_j> = \delta_{ij}$ and $<C_i, C_j> = \delta_{ij}$ where $<F, G> = \text{trace}(F^T G)$.

In some embodiments, image data corresponding to lenslet image 400 may be input to the image data processing system in the form of a matrix A of size (T*V)×(S*U), or any other suitable numerical representation and/or size thereof. For example, each matrix element of matrix A may respectively correspond to a value or number that is representative of, or associated with, a particular macropixel 402 of a plurality of macropixels included in lenslet image 400 and/or any other suitable LF data associated with the particular macropixel 402 of the plurality of macropixels included in lenslet image 400. In some embodiments, each matrix element may correspond to a value or number that is representative of, or associated with, spatial frequency content of one or more portions of lenslet image 400. Such frequency content may be obtained by the image data processing system using any suitable technique, e.g., discrete cosine transform (DCT), discrete Fourier transform (DFT), fast Fourier transform (FFT), Cosine Transform (CT), wavelet transform (WT), short time Fourier transform (STFT) or any other suitable digital signal processing algorithm or technique, or any combination thereof, applied to one or more portions of lenslet image 400. For example, the image data processing system may obtain one or more frequency coefficients associated with respective macropixels for use in matrix A for image data corresponding to lenslet image 400.

In some embodiments, the image data processing system may set parameters for the KP-SVD operation 404, such as, for example, a matrix size for matrix A of (T*V)×(S*U). In the example of FIGS. 4A-4B, where (V, U, T, S)=(433, 625, 15, 15), such matrix may correspond to a size 6495×9375. In some embodiments, the image data processing system may set parameters for each sub-components $B_i$ and $C_i$, which may correspond to Kronecker products in KP-SVD operation 404, to be obtained by decomposing the matrix of size (T*V)×(S*U) representing lenslet image 400. For example, the image data processing system may leverage the consistency of the macropixel structure of the lenslet image in relation to the structure of the matrixes of KP-SVD operation 404 to decompose the lenslet image. As shown at 414 and 416, in the example of FIG. 4A-4B, $B_i$ corresponds to a matrix of the size V×U, and $C_i$ corresponds to a matrix of the size T×S, where $\sigma_1 > \sigma_2 > \ldots > \sigma_{r_A}$. That is, a size of the matrix for sub-component $B_i$ may correspond to a number of the plurality of macropixels included in the image data, and a size of the matrix for sub-component (', may correspond to dimensions of each of the plurality of macropixels 402. The $\sigma_1$ or MN value may correspond to 225 (15*15), and $r_A$=rank(A)=209 linear independent components or terms.

When the KP-SVD operation 404 is applied to the matrix A of size (T*V)×(S*U) representing lenslet image 400, the image data processing system may obtain any suitable number of components (each having respective $B_i$ and $C_i$ sub-components) in summation (e.g., 209 terms, if $r_A$=209), any suitable portion of which may be summed together or aggregated (e.g., at a decoder of a client device) to obtain a reconstruction of lenslet image 400. In some embodiments, sub-component ($B_i$) 414 may correspond to one or more pixel values of a natural image representation of the original scene corresponding to lenslet image 400, and sub-component ($C_i$) 416 may correspond to coefficients representing weighting factors used to weight such pixel values in each of the different portions of the image. Such natural representation of the scene may be represented with fewer dimensions than the lenslet image data comprising the plurality of macropixels. In some embodiments, sub-component $B_i$ 414 may correspond to one or more spatial frequency coefficients corresponding to a natural image representation of one or more portions of lenslet image 400.

In some embodiments, the image data processing system may be configured to encode each component of the plurality of components 406, 408, . . . 410 by encoding the sub-component ($B_i$) 414 and encoding sub-component ($C_i$) 416 (and/or encoding sub-component 412 $\sigma_i$) for each respective component. In some embodiments, each respective sub-component ($B_i$) 414 may be encoded using a different encoding technique as compared to each sub-component ($C_i$) 416. For example, each sub-component ($B_i$) 414 may be encoded using any suitable image or video codec (e.g., JPEG compression, HEVC, the H.265 standard, the Versatile Video Coding (VVC), the H.266 standard, the H.264 standard, the H.263 standard, MPEG-4, MPEG-2, or any other suitable codec or standard, or any combination thereof. In some embodiments, each sub-component ($C_i$) 416 may be encoded using fixed length coding, variable length coding, predictive coding, or any other suitable coding technique, or any combination thereof. In some embodiments, the techniques described herein may be used for intra-frame coding and/or inter-frame coding (e.g., utilizing a motion vector as between frames). In some embodiments, each sub-component ($\sigma_i$) 412 may be encoded using the same encoding technique used to encode sub-component ($C_i$) 416 for each component 406, 408, . . . 410. In some embodiments, at least two of sub-component ($\sigma_i$) 412, sub-component ($B_i$) 414, and sub-component ($C_i$) 416 may be encoded using the same technique, and may be encoded separately or together. In some embodiments, each of sub-component ($\sigma_i$) 412, sub-component ($B_i$) 414, and sub-component ($C_i$) 416 may be encoded separately from each other.

In some embodiments, each sub-component ($B_i$) 414 of a particular component 406, 408, . . . 410 may be encoded separately from the other sub-components ($B_i$) 414 of the other components 406, 408, . . . 410, or may be encoded together with one or more of the other sub-components ($B_i$) 414 of the other components 406, 408, . . . 410. In some embodiments, each sub-component ($C_i$) 416 of a particular component 406, 408, . . . 410 may be encoded separately from the other sub-components ($C_i$) 416 of the other components 406, 408, . . . 410, or may be encoded together with one or more of the other sub-components ($C_i$) 416 of the other components 406, 408, . . . 410. In some embodiments, each sub-component ($\sigma_i$) 412 of a particular component 406, 408, . . . 410 may be encoded separately from the other sub-components ($\sigma_i$) 412 of the other components 406, 408, . . . 410, or may be encoded together with one or more of the other sub-components ($\sigma_i$) 412 of the other components 406, 408, . . . 410.

In some embodiments, for a lenslet image, such as, for example, lenslet image 400 corresponding to (V, U, T, S)=(433, 625, 15, 15), T and S are typically smaller than V and U, and thus $\sigma_i$ (e.g., a matrix of size 1×1) and sub-component $C_i$ (e.g., a matrix of size T×S) 416 may correspond to a relatively lesser amount of data, and thus may be encoded by a less complex technique, e.g., fixed length coding or predictive coding or variable length coding, relative to encoding sub-component ($B_i$) 414. On the other hand, since $B_i$ (e.g., a matrix of size V×U) may correspond to a relatively larger amount of data (e.g., a larger matrix), a suitable image or video codec may be used to encode sub-component ($B_i$) 414. In some embodiments, sub-component ($B_i$) 414 may correspond to a natural image representation of the lenslet image data, and thus may be spatially continuous, enabling use of any suitable existing image codec for natural images.

In some embodiments, sub-component ($B_i$) 414 may have a high dynamic range, and thus normalization may be performed using a set of normalization parameters, e.g., using $max_i$ and $min_i$ shown at 422. In some embodiments, normalization parameters 422 may be included in the encoding data provided to decoder 314, and may be encoded by fixed length coding or any other suitable technique. For example, in the example of FIGS. 4A-4B, sub-component ($B_i$) 414 corresponding to a matrix of size 433×625 may be normalized to values from 0 to 1 or from 0 to 255 or any other suitable scale. In some embodiments, the normalization may be performed prior to encoding the image data, or at any other suitable time.

In some embodiments, the image data processing system may (e.g., at decoder 314 of FIG. 3) perform decoding of the encoded image data (e.g., by encoder 312), which may correspond to a bitstream 313 of encoded image data. For example, at 316, decoder 314 may reconstruct image data 300 from the encoded image data in a reverse process of the decomposition described at 404, e.g., by summation of a plurality of components 406, 408, . . . 410. In some embodiments, the summation may be performed on any suitable number of components 406, 408, . . . 410 received from encoder 312, e.g., a number of components or terms corresponding to g indicated at 418 and 420. For example, the larger the number of received g terms, the better the image quality of reconstructed lenslet image 400 that may be possible by decoder 314, although a tradeoff may be present between image quality and amount of information to be stored and/or transmitted. In some embodiments, decoder 314 may be configured to obtain the Kronecker product (e.g., matrix A) of the received g terms or components, e.g., by performing KP-SVD on Kronecker factors corresponding to sub-components 414 and 416 ($B_i$ and $C_i$), and/or using sub-component $\sigma_i$ 412.

In some embodiments, encoder 312 may achieve compression by transmitting the encoded sub-components 412, 414 and/or 416, which enable a reduction in the parameters representing lenslet image 400 (in comparison to if block matrix A having a size of 6495×9375 were to be transmitted), thereby enabling a reduction in bandwidth and/or storage space required to transmit and/or store lenslet image 400. For example, decoder 314 may perform KP-SVD on the received decomposed components and/or sub-components to obtain such block matrix A when reconstructing lenslet image 400. Such KP-SVD operation may enable such block matrix to be transmitted or stored using fewer parameters (e.g., matrixes corresponding to sub-component ($B_i$) 414 and sub-component ($C_i$) 416) and which may be used to compute the block matrix corresponding to the lenslet image data. In some embodiments, the encoded data (e.g., transmitted via bitstream 313) may comprise each respective sub-component ($B_i$) 414 and each respective sub-component ($C_i$) 416, and/or each respective sub-component ($\sigma_i$) 412 and may include other suitable data (e.g., an indication of which component 406, 408, . . . 410 that a particular sub-component is associated with and/or an indication of which portion of lenslet image 400 the particular sub-component is associated with).

Figure 5A:
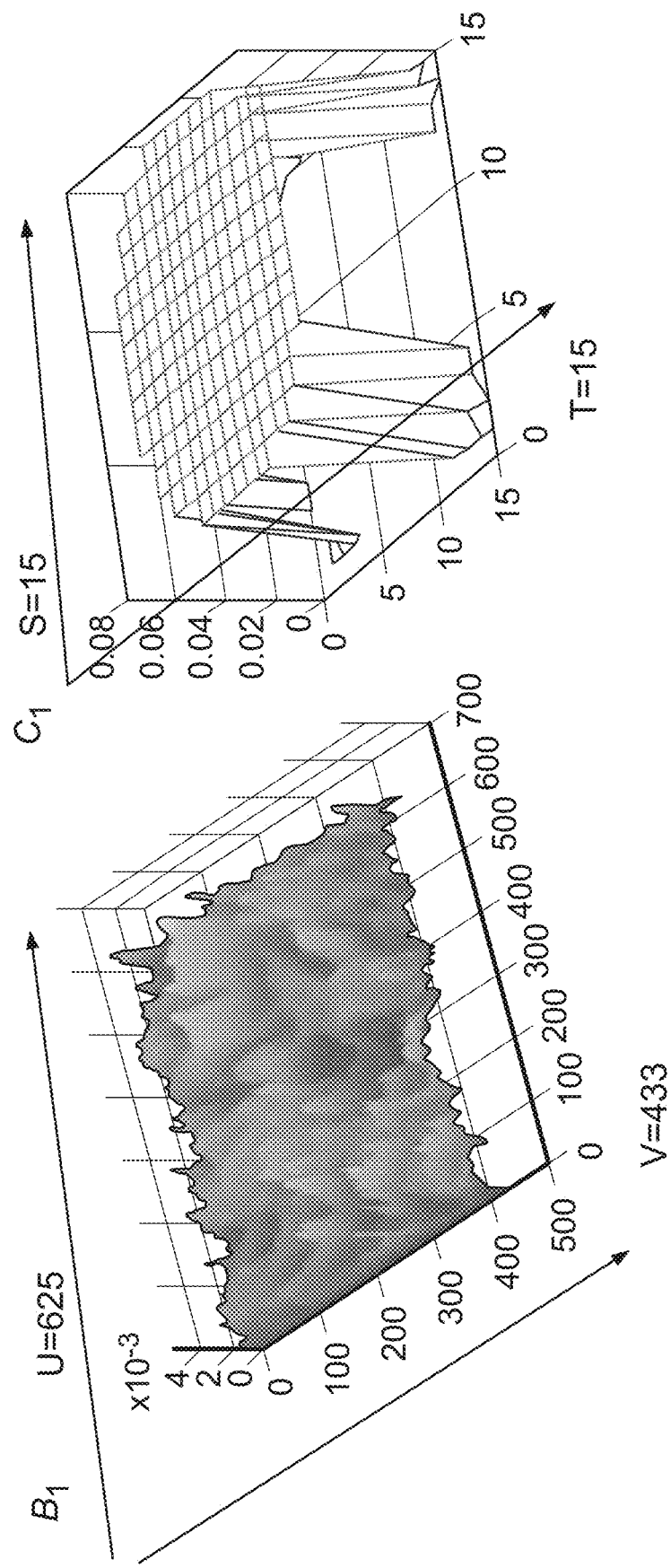
FIGS. 5A-5B show illustrative examples of sub-components By and (', in accordance with some embodiments of this disclosure.
Figure 5B:
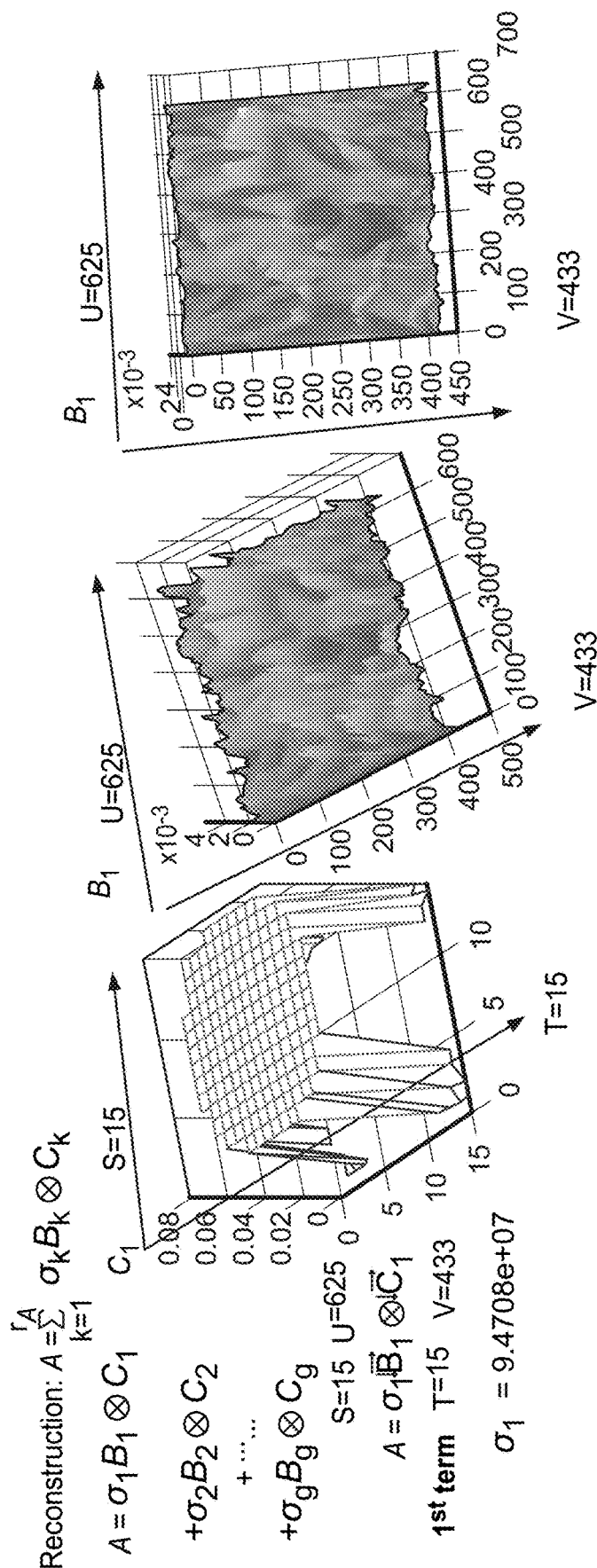

FIG. 5A shows an illustrative example of sub-components $B_1$ and $C_1$, in accordance with some embodiments of this disclosure. FIG. 5A may correspond to the example of FIGS. 4A-4B, where (V, U, T, S)=(433, 625, 15, 15). FIG. 5B shows an illustrative example of sub-components $B_1$ and $C_1$, $B_2$ and $C_2$, $B_3$ and $C_3$, . . . $B_{50}$ and $C_{50}$, . . . and $B_{100}$ and $C_{100}$, in accordance with some embodiments of this disclosure. In some embodiments, where $B_1$, $B_2$, $B_3$ . . . $B_N$ correspond to coefficients of frequency content of lenslet image 400, where a larger subscript may correspond to a relatively higher frequency of lenslet image 400. For example, $B_1$ may represent the lowest frequency component of the image; $B_2$ may represent a relatively higher frequency than $B_1$; $B_3$ may represent a relatively higher frequency than $B_2$; and $B_N$ may represent the highest frequency component of the image. For example, each coefficient may quantify the contribution of a frequency component to the overall image, e.g., higher frequency coefficients may have minimal impact on the overall image as opposed to lower frequency coefficients, which may be more representative of, and be more significant to, the appearance of the lenslet image. In the example of FIGS. 4A-4B, where $r_A$=rank(A)=209, the subscript for the sub-components may range from 1 through 209, where each of such sub-components may be combined (e.g., at a decoder) to reconstruct the full range of frequency for the image. Each component 406, 408 . . . 410 (FIG. 4B) may comprise sub-components 414 and 416 weighted by a variable 412 ($\sigma$), which may descend in value from sub-components $B_1$ . . . $B_N$.

Figure 6:
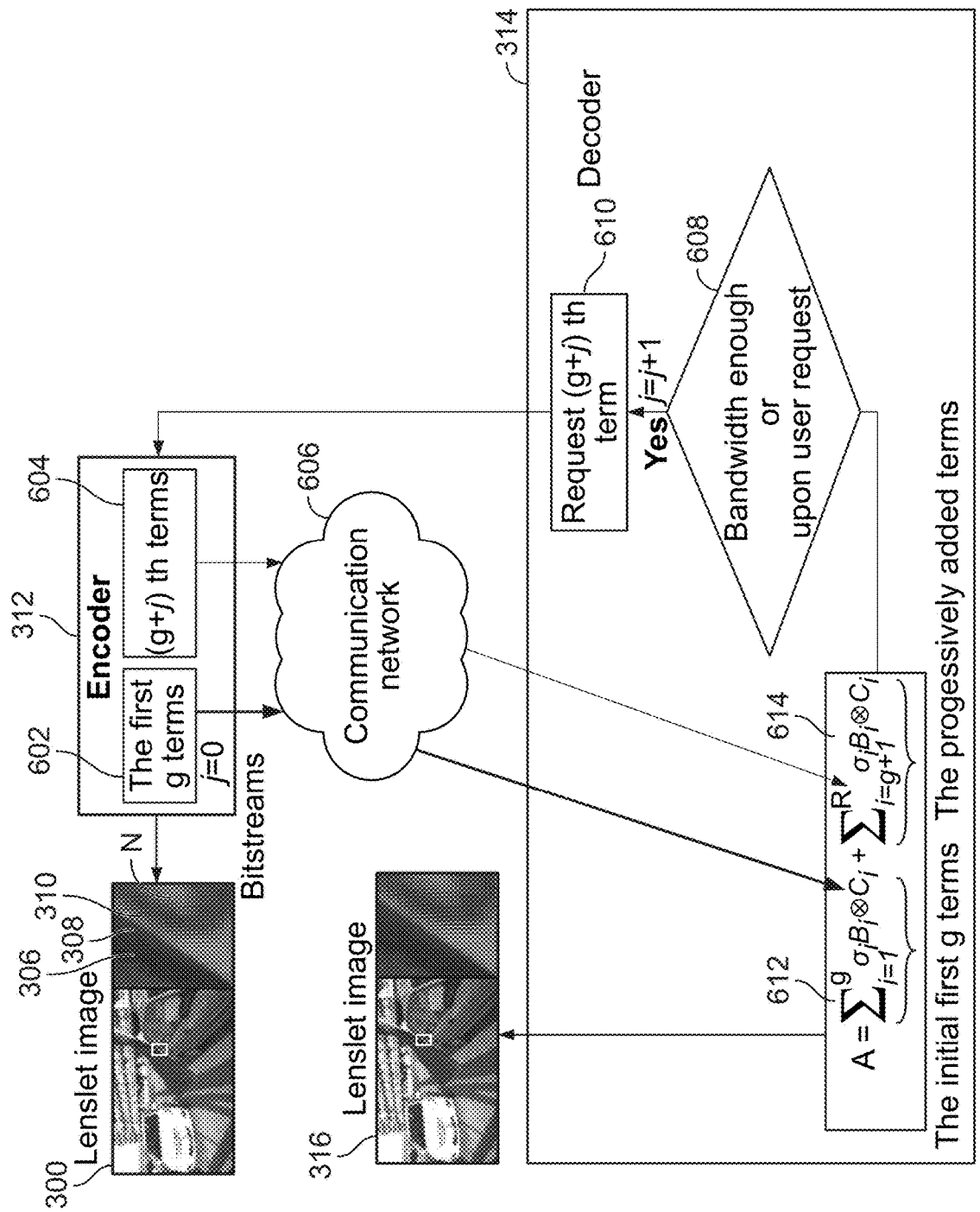
FIG. 6 shows an illustrative flowchart for transmitting additional components of encoded lenslet image data, in accordance with some embodiments of this disclosure.

FIG. 6 shows an illustrative flowchart for transmitting additional components of encoded lenslet image data, in accordance with some embodiments of this disclosure. As shown in FIG. 6, the image data processing system may perform decomposition and/or encoding of lenslet image data in a progressive and scalable manner. For example, as shown at 612, encoder 312 may initially transmit g (e.g., a predefined number) components or terms 406, 408, . . . 410 to a receiver or client device, e.g., including or correspond to decoder 314, over communication network 606 (which may correspond to communication network 909). In some embodiments, g may be a default value for the lenslet image, or g may be determined based on a type of the lenslet image (e.g., an image or a video), based on user preferences, based on current network conditions, based on one or more other characteristics of lenslet image 300, or based on any other suitable criterion, or any combination thereof. For example, the image data processing system may determine that current network conditions (e.g., available bandwidth, an error rate, bit rate, throughput lag, transmission delay, availability, jitter, or any other suitable characteristics, or any combination thereof) at a current time (a first time) permit transmission of g terms, and/or that transmitting g terms satisfies a user request or preference. For example, a current bandwidth may limit the number of components (and/or the image quality of such components) that can be transmitted to decoder 314, since the more components to be transmitted (and/or higher quality components to be transmitted) may require more bandwidth for transmission.

At 608, the image data processing system may determine, at one or more second times after the first time, that the current network conditions have improved sufficiently enough to permit transmission of one or more additional encoded components (e.g., having respective sub-components $B_i$, $C_i$ and $\sigma_i$) and/or that a request has been received from a user at a client device associated with decoder 314 for a higher-quality version of lenslet image 300. Based on such determination(s), the image data processing system may transmit such one or more additional encoded components or sub-components (denoted as j at 604 of FIG. 6), e.g., based on a request (at 610) for such one or more additional encoded components from decoder 314. Decoder 314 may thus generate a reconstruction 316 of lenslet image 300 using the initial g components or terms 612 as well as the progressively added components or terms 614. In some embodiments, g may correspond to a number that is less than a total number of decomposed components 406, 408, . . . 410, e.g., g may be 50 when the total number of decomposed components is 200. In some embodiments, such j terms indicated at 604 may be used to increase the quality of the reconstructed lenslet image, without having to re-transmit the initial g terms 602. In some embodiments, such process may be repeated as bandwidth or network conditions permit, and/or for each component. Such process may be enabled based on encoder 312 of the image data processing system decomposing a lenslet image in a way that the reconstruction is done by "aggregating terms" to increase the image quality, and thus is advantageous in an application of video streaming where bandwidths and user preferences may vary over time.

In some embodiments, each of the g terms 602, as well as the j terms indicated at 604, may be pre-encoded, e.g., encoded at a particular time, even if only the g terms are initially transmitted over network 606 from encoder 312 to decoder 314, e.g., based on what the current network conditions allow for. Alternatively, at a particular time, only the g terms 602 may be encoded, and the j terms indicated at 604 may be encoded as needed, e.g., at a later time on the fly, if requested by decoder 314.

In some embodiments, both a number of components g initially transmitted, and a quality of such components, may depend on what current network conditions permit, and/or user requests received or user preferences. For example, lenslet image 300 may be associated with a manifest employed in any of a variety of streaming protocols, e.g., media presentation description (MPD) files for Dynamic Adaptive Streaming over HTTP (MPEG-DASH), m3u8 files for HTTP Live Streaming (HLS), f4m files for HTTP Dynamic Streaming (HDS), ingest files for CMAF (Common Media Application Format), manifest files for Microsoft Smooth Streaming (MSS), etc. The manifest may be a standard manifest (e.g., an MPD file from MPEG-DASH) or may be a modified version of a standard manifest. The manifest may be a file and/or a data structure containing information about sequential segments (comprising sequential frames) of a media asset that is available to a client device. Such information may include, e.g., a number of segments in a playlist, bit rates of each segment, codecs associated with each segment, resolution of each segment, parental rating associated with each segment, timing of each segment, location on the network where a segment may be retrieved, bandwidth of each segment, video tracks of each segment, audio tracks of each segment, subtitle tracks of each segment, captions of each segment, languages of each segment, metadata associated with each segment, or any other suitable information, or any combination thereof.

For example, each component 406, 408 . . . 410 may correspond to at least a portion of a segment of a media asset. A segment may comprise information (e.g., encoded video, audio, subtitle information, error correction bits, error detection bits, etc.) for a particular interval of a media asset, and each segment may correspond to a file specified in the manifest indicating an associated URL for retrieving the file. The segment may comprise a collection or sequence of frames (e.g., still images that together make up moving pictures of scenes of a portion of a media asset), and each segment may have a specific length (e.g., from zero to a few seconds). In the segment-based delivery of media content using the above-mentioned streaming protocols, various techniques may be employed (e.g., MPEG-2 Transport stream format, MPEG-4 format such as the fragmented MPEG-4 format).

The image data processing system may reference the manifest, and determine to transmit (e.g., as part of the g encoded terms 602) to decoder 314 components of a certain bit rate or resolution based on current network conditions and/or a user request. On the other hand, the image data processing system may reference the manifest, and determine to transmit (e.g., as part of the additional encoded j terms indicated at 604) to decoder 314 components of a higher bit rate or resolution based on improved network conditions and/or a user request.

Such aspects may enable the image data processing system to implement progressive and scalable encoding to increase the quality at the decoder by sending partial information to decoder 314. In some embodiments, the image data processing system may decode and generate for display a reconstruction of the encoded data by progressively adding the terms together sequentially in the order of the descending order of the magnitude of the corresponding components and/or sub-components, to improve the reconstruction quality.

Figure 7:
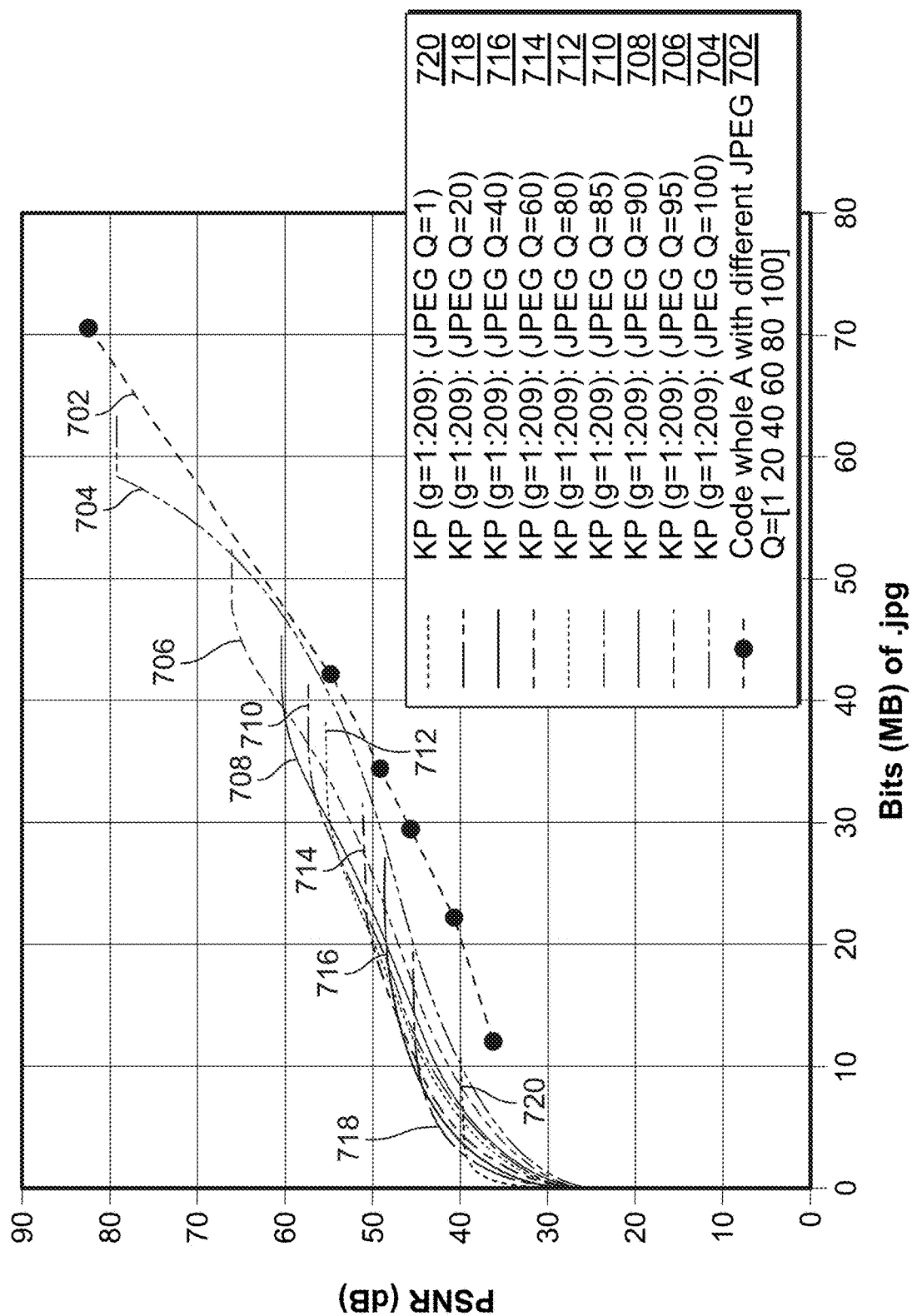
FIG. 7 shows illustrative results of performing encoding of image data using the techniques described herein, in accordance with some embodiments of this disclosure.

FIG. 7 shows illustrative results of performing encoding of image data using the techniques described herein, in accordance with some embodiments of this disclosure. As discussed herein, the image data processing system may directly encode lenslet image data, and such directly encoded lenslet image data can be decoded to reconstruct the lenslet image. As shown in FIG. 7, a quality index Q can be set to create different rate-distortion results, using a lenslet image A of 12 bits. The quality of the restored image is measured in PSNR:

$$PSNR = 10 \cdot \log_{10}\left(\frac{MAX_I^2}{MSE}\right)$$

where $MAX_I = (2^{12}) - 1$, and the rate is the size of the bitstream. FIG. 7 shows rate-distortion comparison results for an illustrative lenslet image having parameters (V, U, T, S)=(433, 625, 15, 15). Line 702 corresponds to the benchmark method with five quality index Q=1, 20, 40, 60, 80, 100 and their rate-PSNR results, Q=1 being the worst quality and least number of bits, Q=20 being a higher quality and higher number of bits compared to Q=1, and so on. Q=100 is depicted by line 704, which is formed by connecting $r_A$ rate-PSNR points ($r_A$=209 in this particular case). Each g-th point, g=1~$r_A$, from left to right along the x-axis, is the result of first g terms. As can be seen, as the g grows, the PSNR becomes better, with a higher bitrate. The comparison also shows that the techniques described herein largely achieve better results than benchmark line 702. Similar trends can be observed for Q=1, 20, 40, 60, 80, 85, 90, and 95, shown by lines 720, 718, 716, 714, 712, 710, 708, 706, respectively.

Such results exhibit a conceptual plot of bitrate-quality relationship. Each Q setting has a bitrate region, where it outperforms other Q settings. A collection of these regions may form a boundary of a convex hull. In image and video compression, the convex hull shows where the encoding point achieves Pareto efficiency. While it may be highly desirable to operate at the convex hull, it may be practically prohibitive to generate all the data points. In some embodiments, the image data processing system described herein may leverage heuristic-based and/or machine learning techniques, e.g., using trial encodings of a small number of Q settings, to predict, interpolate and form the operating points close to the convex hull.

Figure 9B:
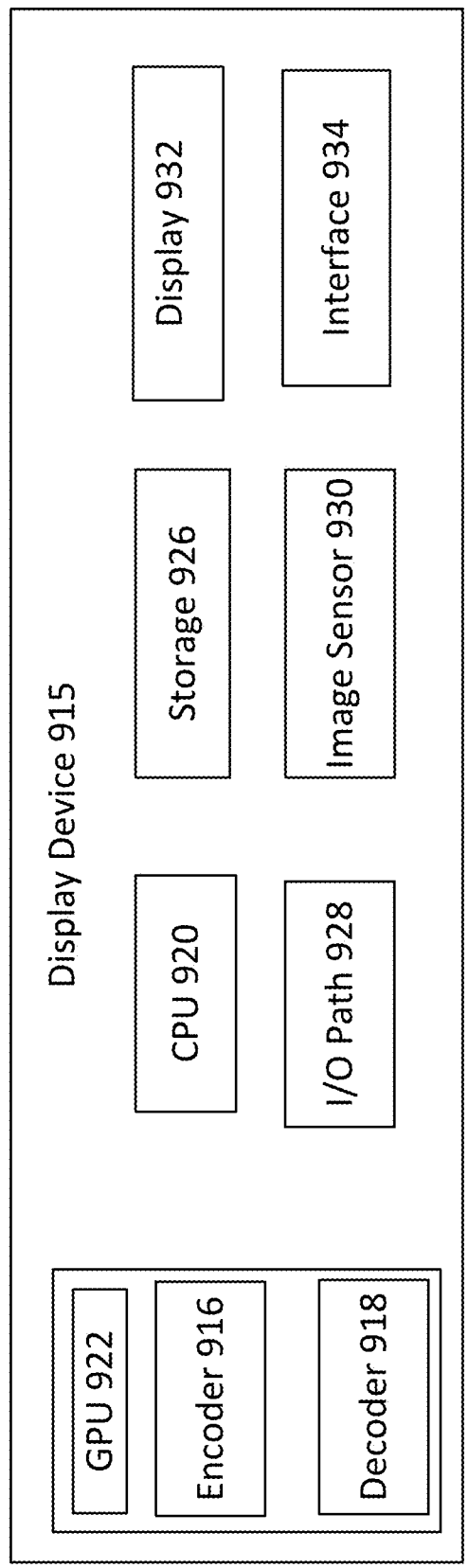

FIGS. 8, 9A and 9B describe illustrative devices, systems, servers, and related hardware for encoding image data, in accordance with some embodiments of this disclosure. FIG. 8 shows generalized embodiments of illustrative user devices 800 and 801. For example, user device 800 may correspond to or include a 3D or 2D display, a tablet, a camera, smart glasses, smartphone device, a tablet, a near-eye display device, a virtual reality or augmented reality device, or any other suitable computing device capable of generating for display, and/or displaying, and/or enabling a user to consume, and/or decoding, a lenslet image, and/or capable of transmitting and receiving data, e.g., over a communication network. In another example, user device 801 may be a user television equipment system or device.

User television equipment device 801 may include set-top box 815. Set-top box 815 may be communicatively connected to microphone 816, audio output equipment (e.g., speaker or headphones 814), and display 812. In some embodiments, microphone 816 may receive audio corresponding to a voice of a video conference participant and/or ambient audio data during a video conference. In some embodiments, display 812 may be a television display or a computer display. In some embodiments, set-top box 815 may be communicatively connected to user input interface 810. In some embodiments, user input interface 810 may be a remote control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user devices are discussed below in connection with FIG. 9A. In some embodiments, device 800 may comprise any suitable number of sensors (e.g., gyroscope or accelerometer, etc.), and/or a GPS module (e.g., in communication with one or more servers and/or cell towers and/or satellites) to ascertain a location of device 800. In some embodiments, device 800 comprises a rechargeable battery that is configured to provide power to the components of the device.

Each one of user device 800 and user device 801 may receive content and data via input/output (I/O) path 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 3 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., device 800), an XR device, a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the image data processing system stored in memory (e.g., storage 808). Specifically, control circuitry 804 may be instructed by the image data processing system to perform the functions discussed above and below. In some implementations, processing or actions performed by control circuitry 804 may be based on instructions received from the image data processing application.

In client/server-based embodiments, control circuitry 804 may include communications circuitry suitable for communicating with a server or other networks or servers. The image data processing system may be a stand-alone application implemented on a device or a server. The image data processing system may be implemented as software or a set of executable instructions. The instructions for performing any of the embodiments discussed herein of the image data processing system may be encoded on non-transitory computer-readable media (e.g., a hard drive, random-access memory on a DRAM integrated circuit, read-only memory on a BLU-RAY disk, etc.). For example, the instructions may be stored in storage 808, and executed by control circuitry 804 of a device 800.

In some embodiments, the image data processing system may be a client/server application where only the client application resides on device 800, and a server application resides on an external server (e.g., media content source 902 and/or server 904). For example, the image data processing system may be implemented partially as a client application on control circuitry 804 of device 800 and partially on server 904 as a server application running on control circuitry 911. Server 904 may be a part of a local area network with one or more of devices 800, 801 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 904 and/or an edge computing device), referred to as "the cloud." Device 800 may be a cloud client that relies on the cloud computing capabilities from server 904 to perform the functionalities of the image data processing system described herein. When executed by control circuitry of server 904, the image data processing system may instruct control circuitry 911 to perform processing tasks for the client device and facilitate the decomposition of and/or encoding of and/or decoding of lenslet image data and/or any other suitable functionalities of the image data processing system.

Control circuitry 804 may include communications circuitry suitable for communicating with a server, edge computing systems and devices, a table or database server, or other networks or servers The instructions for carrying out the above mentioned functionality may be stored on a server (which is described in more detail in connection with FIG. 9A. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9A). In addition, communications circuitry may include circuitry that enables peer-to-peer communication of user devices, or communication of user devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as the image data processing system data described above. Nonvolatile memory may also be used (e.g., to launch a boot-up routine and other instructions). Cloud-based storage, described in more detail in relation to FIG. 9A, may be used to supplement storage 808 or instead of storage 808.

Control circuitry 804 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 804 may also include scaler circuitry for upconverting and downconverting content into the preferred output format of user device 800. Control circuitry 804 may also include digital-to-analog converter circuitry and analog-to-digital converter circuitry for converting between digital and analog signals. The tuning and encoding circuitry may be used by user device 800, 801 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user device 800 and user device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and device 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words or terms or numbers that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The image data processing system may be implemented using any suitable architecture. For example, it may be a stand-alone application wholly implemented on each one of user device 800 and user device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide video conferencing functionality and generate any of the displays discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a conference participant profile. Control circuitry 804 may obtain all or part of other user profiles that are related to a particular user (e.g., via social media networks), and/or obtain information about the user from other sources that control circuitry 804 may access. As a result, a user can be provided with a unified experience across the user's different devices.

In some embodiments, the image data processing system is a client/server-based application. Data for use by a thick or thin client implemented on each one of user device 800 and user device 801 may be retrieved on-demand by issuing requests to a server remote to each one of user device 800 and user device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to device 800 for presentation to the user.

In some embodiments, the image data processing system may be downloaded and interpreted or otherwise run by an interpreter or virtual machine (run by control circuitry 804). In some embodiments, the image data processing system may be encoded in the ETV Binary Interchange Format (EBIF), received by control circuitry 804 as part of a suitable feed, and interpreted by a user agent running on control circuitry 804. For example, the image data processing system may be an EBIF application. In some embodiments, the image data processing system may be defined by a series of JAVA-based files that are received and run by a local virtual machine or other suitable middleware executed by control circuitry 804. In some of such embodiments (e.g., those employing MPEG-2, MPEG-4, HEVC or any other suitable digital media encoding schemes), the image data processing system may be, for example, encoded and transmitted in an MPEG-2 object carousel with the MPEG audio and video packets of a program.

FIG. 9A is a diagram of an illustrative system 900 for enabling user controlled extended reality, in accordance with some embodiments of this disclosure. User devices 907, 908, 910 (which may correspond to, e.g., user device 800 or 801) may be coupled to communication network 909. Communication network 909 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 909) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9A to avoid overcomplicating the drawing.

Although communications paths are not drawn between user devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user devices may also communicate with each other directly through an indirect path via communication network 909.

System 900 may comprise media content source 902, one or more servers 904, and/or one or more edge computing devices. In some embodiments, the image data processing system may be executed at one or more of control circuitry 911 of server 904 (and/or control circuitry of user devices 907, 908, 910 and/or control circuitry of one or more edge computing devices). In some embodiments, the media content source and/or server 904 may be configured to host or otherwise facilitate video communication sessions between user devices 907, 908, 910 and/or any other suitable user devices, and/or host or otherwise be in communication (e.g., over network 909) with one or more social network services.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide video conferencing data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

In some embodiments, one or more of devices 907, 908, 910 may correspond to display device 915 of FIG. 9B. Display device 915 may be a 3D or 2D display device coupled to network 909 and that comprises one or more of each of GPU 922, encoder 916, decoder 918, CPU 920, storage 926, I/O path 928, image sensor 930, display 932, and video interface 934. GPU 922 may correspond to a computing processor specially designed to quickly process video signals, and may be implemented as part of a graphics card. In some embodiments, GPU 922 may comprise encoder 916 and/or decoder 918, or encoder 916 and/or decoder 918 may be otherwise separately implemented within or external to display device 915. In some embodiments, server 904 and/or media content source 902 may comprise or be part of a content delivery network (e.g., comprising one or more data centers, and/or edge device), with any suitable number of GPUs comprising encoders 916 and decoders 918, e.g., configured to perform at least a portion of encoding and/or decoding of the image data. For example, display device 915 may receive encoded data locally or over a communication network. In some embodiments, display device 915 may comprise any suitable hardware and/or software configured to perform multiplexing and/or demultiplexing of image data.

In some embodiments, decoder 918 may correspond to decoder 314 of FIGS. 3 and 6. Decoder 918 may comprise any suitable combination of hardware and/or software configured to convert data in a coded form to a form that is usable as video signals and/or audio signals or any other suitable type of data signal, or any combination thereof. In some embodiments, encoder 916 may correspond to encoder 312 of FIGS. 3 and 6. Encoder 916 may comprise any suitable combination of hardware and/or software configured to process data to reduce storage space required to store the data and/or bandwidth required to transmit the image data, while minimizing the impact of the encoding on the quality of the video or one or more images. Encoder 916 and/or decoder 918 may utilize any suitable algorithms and/or compression standards and/or codecs. In some embodiments, encoder 916 and/or decoder 918 may be a virtual machine that may reside on one or more physical servers that may or may not have specialized hardware, and/or a cloud service may determine how many of these virtual machines to use based on established thresholds. In some embodiments, separate audio and video encoders and/or decoders may be employed. In some embodiments, the functions of the decoder and encoder may be combined into a single entity, e.g., a programmed microcomputer which may perform a particular compression algorithm in both directions. In some embodiments, encoder 916 and/or decoder 918 may be part of, or external to, CPU 920. In some embodiments, encoder 916 and/or decoder 918 may comprise any suitable number of encoders, at a single location or distributed at any suitable number of locations.

Display 932 may be configured to be capable of generating for display the received image data by reconstructing every possible view and perspective of the content to one or more observers. In some embodiments, the display may be a LF display, tensor display, multi-layer display, LCD display, a display of any suitable computing device, a display provided in an automobile, or any other suitable type of display capable of displaying 3D content, or any combination thereof, using any suitable display scheme. In some embodiments, the display may be an integral display, or a modular display in which a display is built from modular elements that tile together.

In some embodiments, display 932 may be capable of providing a 3D viewing experience to the user with or without the aid of an additional device, e.g., glasses equipped with temporal shutters, polarizers, color filters, or other optical or optoelectronic elements. In some embodiments, the display may be configured to display holograms or holographic structures. In some embodiments, the display may access image data over any suitable data interface (e.g., HDMI, DisplayPort, or any other suitable interface, or any combination thereof) over which image data may be received, e.g., from memory and/or over a network and/or any other suitable source. The display and/or camera and/or any other suitable components may be configured to computationally synthesize views from different angles and different focuses.

Display 915 may be understood as a LF display configured such that as the user moves his or her head and/or his or her eyes and/or his or her body to view the LF display from different angles or vantage points, the one or more images provided via the LF display may appear to the user to shift in perspective according to the perception angle of the new vantage point. This may give the user the impression that the object is actually present, thus making the user perceive the image as three-dimensional. For example, a user's perspective may shift if the user physically pans from left to right with respect to display 915, or otherwise modifies his or her viewing location, or if a user manipulates or shifts a device comprising 3D display 915 relative to him- or herself). Such views or perspectives may be 2D, and a plurality of the views may together make up a single frame of a media asset, as discussed in more detail below. In some embodiments, the frame may comprise a plurality of views corresponding to a single instance in time, e.g., captured images of a particular real world scene and/or computer-generated images of a particular scene. In some embodiments, pixel values of LF imagery may be a function of a location of the user and viewing angle of the user.

The views may be horizontal-parallax-only (in which the view perceived by the user only changes as the user's perspective changes from side to side), vertical-parallax-only (in which the view perceived by the user only changes as the user's perspective changes in an upwards or downwards direction), of a full parallax view (in which the view changes as the user's perspective shifts up and down and/or side to side) or any other suitable arrangement may be employed, or any combination thereof. Imagery displayed by 3D display 915 may be generated based on image data (e.g., one or more images and/or video) captured with an image sensor and a lenslet array, or a 2D camera array, or may be a multi-view rendering of synthetic content such as from a 3D model (e.g., a CGI model) or game engine rendered with a virtual camera in an array of positions, or may be captured or generated using any other suitable electro-optic or opto-electronic mechanism, or any other suitable methodology, or any combination thereof. Such imagery may facilitate a realistic 3D viewing experience to an observer using any suitable number of 2D views. In some embodiments, each pixel of the display may be associated with color and brightness values, and may be configured to be perceived differently in different angular directions, e.g., left, right, up, down, etc., based on the orientation and direction information.

CPU 920 may be implemented in a similar manner as control circuitry 804, and storage 926 may be implemented in a similar manner as storage 808. In some embodiments, interface 934 may be any suitable interface configured to transmit video and/or audio data to display 932, and may utilize any suitable multiplexing or demultiplexing technique to combine or separate signals. In some embodiments, decoder 918 may be external to, or comprise part of, display 932. I/O path 928 may be implemented in a similar manner as I/O path 802, and/or display device 915 may include an image sensor implemented in a similar manner as camera 818. In some embodiments, image sensor 930 may correspond to device 100, microlens array 106, main lens 108, and/or photosensor 110 of FIG. 1, and may comprise or be implemented as part of a 2D camera array or image sensor and internal microlens arrangement, configured to capture LF information of a scene.

Figure 10:
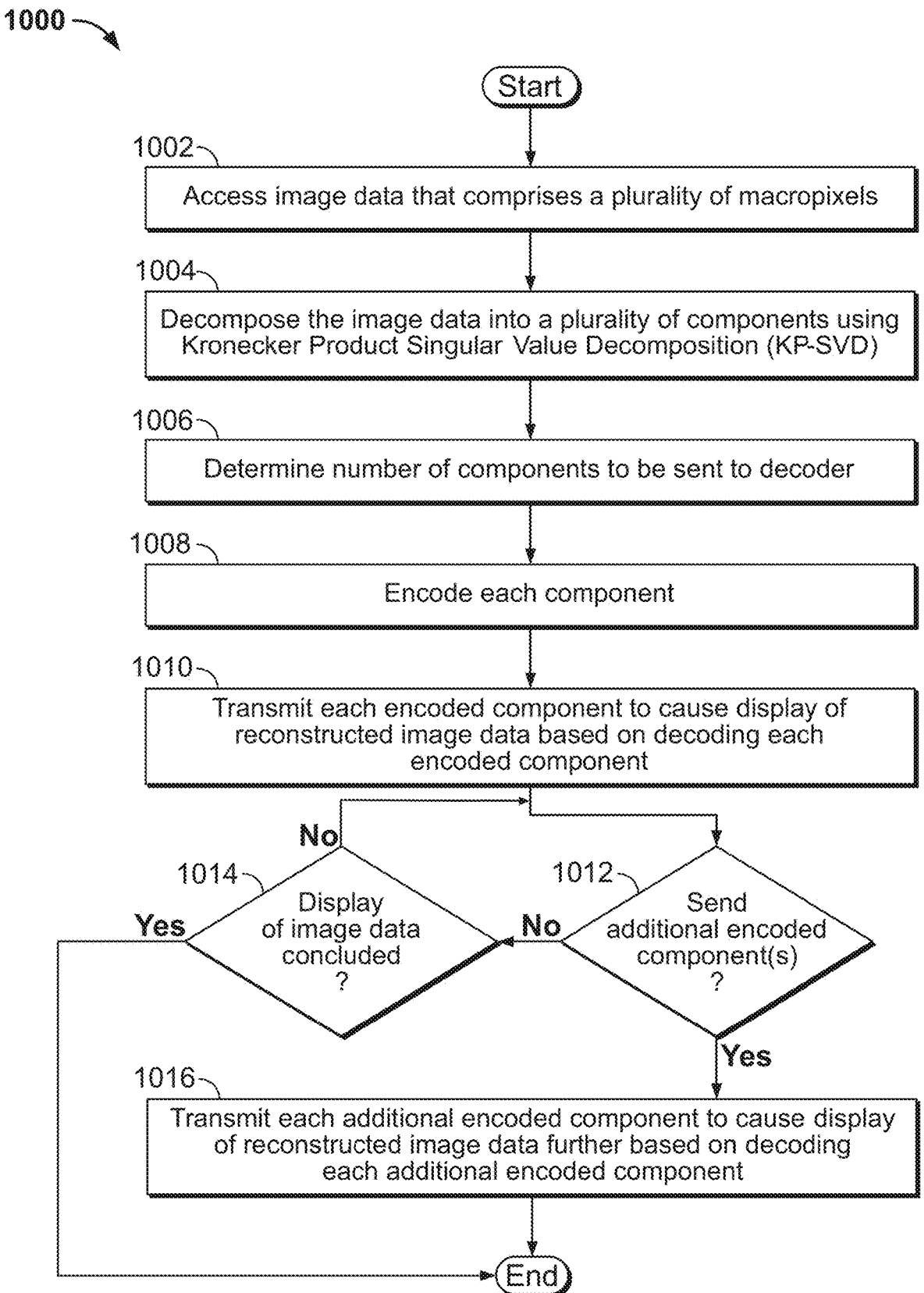
FIG. 10 is a flowchart of a detailed illustrative process for decomposing and encoding a lenslet image, in accordance with some embodiments of this disclosure.

FIG. 10 is a flowchart of a detailed illustrative process for decomposing and encoding a lenslet image, in accordance with some embodiments of this disclosure. In various embodiments, the individual steps of process 1000 may be implemented by one or more components of the devices and systems of FIGS. 1-9. Although the present disclosure may describe certain steps of process 1000 (and of other processes described herein) as being implemented by certain components of the devices and systems of FIGS. 1-9, this is for purposes of illustration only, and it should be understood that other components of the devices and systems of FIGS. 1-9 may implement those steps instead. In addition, one or more steps of process 1000 may be incorporated into or combined with one or more steps of any other process or embodiment disclosed herein, or any combination thereof.

At 1002, control circuitry (e.g., control circuitry 804 of FIG. 8 and/or control circuitry 911 of FIG. 9A) may be configured to access image data (e.g., lenslet image 300) that comprises a plurality of macropixels (e.g., macropixels 306, 308, 310, . . . N of FIG. 3). Such image data may be generated using a device (e.g., device 100 of FIG. 1) comprising a lenslet array (e.g., lenslet array of FIG. 1). The control circuitry may access such image data, and perform the subsequent steps of FIG. 10, as part of a process of decomposing and encoding the image data for storage and/or transmission.

In some embodiments, the image data processing system may access such lenslet image data over a network (e.g., communication network 909 of FIG. 9A or any other suitable network) stored at, for example, media content source 902 and/or server 904 of FIG. 9A, may access one or more of the images from a website or application or any other suitable data source, or any combination thereof. Additionally or alternatively, the image data processing system may access one or more of the images by capturing and/or generating the images, and/or retrieving the images from memory (e.g., memory or storage 804 of device 800, 801 of FIG. 8; memory or storage of device 907, 908, 910 of FIG. 9A; or memory or storage 914 of server 904 or database 905; or any other suitable data store; or any combination thereof) and/or receiving the images over any suitable data interface, or by accessing the images using any other suitable methodology, or any combination thereof. In some embodiments, the image data processing system may be configured to access, and/or perform processing on, output, or transmit the images at least in part based on receiving a user input or a user request, e.g., via user input interface 810 of FIG. 8 and/or I/O circuitry of display device 915 of FIG. 9B.

At 1004, the control circuitry may decompose the image data into a plurality of components (e.g., components 406, 408, . . . 410, corresponding to $\sigma_1 B_1 \otimes C_1$; $\sigma_2 B_2 \otimes C_2$ . . . $\sigma_{r_A} B_{r_A} \otimes C_{r_A}$, respectively, shown in FIG. 4B)) using KP-SVD. For example, image data corresponding to the lenslet image data (e.g. lenslet image data corresponding to lenslet image 400 shown in FIG. 4A) may be input to the image data processing system in the form of a matrix A of size (T*V)×(S*U). In some embodiments, each matrix element of matrix A may respectively correspond to a value or number that is representative of, or associated with, a particular macropixel 402 of a plurality of macropixels included in lenslet image 400 and/or any other suitable LF data associated with the particular macropixel 402 of the plurality of macropixels included in lenslet image 400. In some embodiments, each matrix element may correspond to a value or number that is representative of, or associated with, spatial frequency content of one or more portions of lenslet image 400. In some embodiments, each component (e.g., components 406, 408, . . . 410 of FIG. 4B) may include respective sub-components $(\sigma_i)$ 412, $(B_i)$ 414, and $(C_i)$ 416 as shown in FIG. 4B. In some embodiments, sub-component $(B_i)$ 414 may correspond to one or more pixel values of a natural image representation of the original scene corresponding to lenslet image 400, and sub-component $(C_i)$ 416 may correspond to coefficients representing weighting factors used to weight such pixel values in each of the different portions of the image.

The control circuitry may cause performance of the KP-SVD (e.g., indicated at 412) on block matrix A operation to obtain, for each components, a respective sub-component $B_i$ corresponding to a matrix of the size V×U (e.g., 414 of FIG. 4B) and a respective sub-component $C_i$ corresponding to a matrix of the size T×S (e.g., 416 of FIG. 4B). That is, a size of the matrix for sub-component $B_i$ may correspond to a number of the plurality of macropixels included in the image data, and a size of the matrix for sub-component $C_i$ may correspond to dimensions of each of the plurality of macropixels 402. Any suitable number of components (e.g., components 406, 408, . . . 410 of FIG. 4B) may be obtained by the control circuitry using the KP-SVD (e.g., 209 terms, if $r_A$=209). In some embodiments, the plurality of components obtained at 1004 may correspond to every component (e.g., 209 components in the example of FIGS. 4A-4B) required to fully reconstruct the lenslet image data, or any suitable subset thereof.

At 1006, the control circuitry may determine a number of components to be sent to a decoder (e.g., decoder 314 of FIG. 3 and FIG. 6). For example, the control circuitry may determine that a number of components correspond to g components. Such determination may be based on an analysis of current network conditions, e.g., of a communication path between server 904 (or media content source 902) of FIG. 9A, and display device 915 of FIG. 9B), and/or based on a user request or user preferences received from or associated with a user profile of a client device (e.g., display device 915). For example, the image data processing system may determine that current network conditions (e.g., available bandwidth, an error rate, bit rate, throughput lag, transmission delay, availability, jitter, or any other suitable characteristics, or any combination thereof) at a current time (a first time) permit transmission of g terms, and/or that transmitting g terms satisfies a user request or preference.

At 1008, the control circuitry may encode each component. In some embodiments, at 1008, the control circuitry may encode every component (e.g., 209 components in the example of FIGS. 4A-4B) required to fully reconstruct the lenslet image data, or may encode any suitable subset thereof. For example, if at 1006 the control circuitry determines that g=50, the control circuitry may encode the first 50 components, e.g., $\sigma_1 B_1 \otimes C_1; \sigma_2 B_2 \otimes C_2 \ldots \sigma_{50} B_{50} \otimes C_{50}$.

In some embodiments, encoding each component may comprise encoding each respective sub-component (e.g., $B_i$ 414; $C_i$ 416; and $C_i$ 412). For example, each sub-component ($B_i$) 414 may be encoded using a first encoding technique corresponding to any suitable image or video codec (e.g., JPEG compression, HEVC, the H.265 standard, the Versatile Video Coding (VVC), the H.266 standard, the H.264 standard, the H.263 standard, MPEG-4, MPEG-2, or any other suitable codec or standard, or any combination thereof. In some embodiments, other sub-components (e.g., $C_i$ 416 and $\sigma_i$ 412) may be encoded using a different encoding technique from the first encoding technique, e.g., fixed length coding, variable length coding, predictive coding, or any other suitable coding technique, or any combination thereof.

At 1010, the control circuitry may transmit each encoded component to cause display of reconstructed image data based on decoding each encoded component. For example, a server (e.g., server 904, or media content source 902, of FIG. 9) may transmit each encoded component to any suitable number of user equipment devices 907, 908, 910 and/or 915 of FIGS. 9A-9B or to any other suitable computing device. The number transmitted encoded components may correspond to a total number of components (e.g., 209 in the example of FIGS. 4A-4B) required to fully reconstruct the image or any suitable subset thereof (e.g., the number of components, g, determined at 1008). In some embodiments, each encoded component of the plurality of components is transmitted in a sequential order of ascending frequency values, e.g., respective sub-components $B_1, B_2 \ldots B_N$ may correspond to coefficients of frequency content of the lenslet image, where a larger subscript may correspond to a relatively higher frequency of lenslet image 400. For example, $B_1$ may represent the lowest frequency component of the image; $B_2$ may represent a relatively higher frequency than $B_1$; $B_3$ may represent a relatively higher frequency than $B_2$; and $B_N$ may represent the highest frequency component of the image.

In some embodiments, the control circuitry may cause a device (e.g., any suitable number of user equipment devices 907, 908, 910 and/or 915) to decode, and generate for display a reconstruction of, the encoded image data. For example, the control circuitry may cause the device to progressively adding the terms together sequentially in the order of the descending order of the magnitude of the corresponding components and/or sub-components, to improve the reconstruction quality. In some embodiments, such decoding of one or more lenslet images can facilitate an LF user experience of a media asset for one or more users.

At 1012, the control circuitry may determine whether to send one or more additional encoded components to the client device (e.g., any suitable number of user equipment devices 907, 908, 910 and/or 915 of FIGS. 9A-9B). For example, the control circuitry may determine, at one or more times after the encoding at 1008 and/or transmitting at 1010, whether the current network conditions have improved sufficiently enough to permit transmission of one or more additional encoded components (e.g., having respective sub-components $B_i$, $C_i$ and, $\sigma_i$) and/or that a request has been received from a user at a client device associated with decoder 314 for a higher-quality version of lenslet image 300. If so, processing may proceed to 1014; otherwise processing may proceed to 1016.

At 1014, the control circuitry may determine whether display of the image data has concluded, e.g., whether a media asset runtime has ended, or a user has requested to stop viewing the lenslet image data, or a user has otherwise indicated a desire not to be provided with a higher quality image than a current image. If so, processing may end. On the other hand, a negative determination at 1014 may cause processing to return to 1012.

At 1014, the control circuitry may transmit each additional encoded component to cause display of reconstructed image data further based on decoding each additional encoded component. Such aspects may enable the decoding process to improve picture quality of the image data as it continues parsing and decoding the bitstream of a lenslet image. For example, the control circuitry may transmit such one or more additional encoded components or sub-components (denoted as j at 604 of FIG. 6), e.g., based on a request (at 610 of FIG. 6) for such one or more additional encoded components from the decoder (e.g., decoder 314 of FIG. 3 and FIG. 6). The decoder may thus generate a reconstruction (e.g., 316 of lenslet image 300, as shown in FIGS. 3 and 6) using the initial g components or terms (e.g., 612 of FIG. 6, which may be determined at 1006 at FIG. 10) as well as the progressively added components or terms (e.g., 614 at FIG. 6). In some embodiments, such j terms indicated at 604 may be used to increase the quality of the reconstructed lenslet image, without having to re-transmit the initial g terms 602. In some embodiments, such process may be repeated as bandwidth or network conditions permit, and/or for each component.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
accessing image data that comprises a plurality of macropixels, wherein the image data is generated using a device comprising a lenslet array;
decomposing, using Kronecker product singular value decomposition (KP-SVD), the image data into a plurality of components, each respective component comprising a first sub-component and a second sub-component, the decomposing comprising:
determining a first matrix corresponding to the first sub-component, wherein a size of the first matrix is determined based on the number of the plurality of macropixels included in the image data; and
determining a second matrix corresponding to the second sub-component, wherein a size of the second matrix is determined based on the dimensions of each of the plurality of macropixels;
encoding each first sub-component using an image codec;
encoding each second sub-component using fixed-length encoding; and
transmitting each encoded component of the plurality of components to cause display of reconstructed image data based on decoding each encoded component of the plurality of components.

2. The method of claim 1, wherein each component of the plurality of components is determined based on the number of the plurality of macropixels included in the image data and the dimensions of each of the plurality of macropixels.

3. The method of claim 1, wherein the first sub-component corresponds to a natural image representation of the image data, and the second sub-component corresponds to a weighting factor to be applied to the first sub-component.

4. The method of claim 1, further comprising:
prior to encoding the first sub-component, normalizing the first sub-component using a set of normalization parameters;
wherein transmitting each encoded component of the plurality of components further comprises transmitting the set of normalization parameters.

5. The method of claim 1, further comprising:
decomposing the image data into one or more additional components in addition to the plurality of components; and
encoding each of the one or more additional components;
wherein the transmitting each encoded component of the plurality of components is performed based on determining that current network conditions permit the transmitting of each encoded component of the plurality of components, but do not permit transmitting each of the one or more additional encoded components; and
the method further comprising:
in response to determining that the current network conditions have improved to permit transmission of the one or more additional encoded components, transmitting the one or more additional encoded components.

6. The method of claim 1, further comprising:
decomposing the image data into one or more additional components in addition to the plurality of components;
encoding each of the one or more additional components;
after transmitting each encoded component of the plurality of components, receiving a request for a higher-quality version of the image data; and
in response to receiving the request, transmitting the one or more additional encoded components.

7. The method of claim 1, wherein the plurality of components corresponds to respective different frequency values associated with the image data, and each encoded component of the plurality of components is transmitted in a sequential order of ascending frequency values.

8. The method of claim 1, wherein:
each encoded component of the plurality of components is transmitted to a client device;
the client device is configured to perform the decoding of each encoded component of the plurality of components, and generating for display the reconstructed image data; and
the reconstructed image data is generated for display by aggregating the plurality of components at the client device.

9. The method of claim 1, wherein the number of the plurality of macropixels is based on a first number of macropixels in a first direction of an image corresponding to the image data and a second number of macropixels in a second direction of the image, and wherein the first matrix comprises a number of columns corresponding to the first number of macropixels, and wherein the first matrix comprises a number of rows corresponding to the second number of macropixels.

10. The method of claim 1, wherein the dimensions of each of the plurality of macropixels is based on a first number of pixels in a first direction of a respective macropixel in an image corresponding to the image data and a second number of pixels in a second direction of the respective macropixel in the image, and wherein the second matrix comprises a number of columns corresponding to the first number of pixels, and wherein the second matrix comprises a number of row corresponding to the second number of pixels.

11. A computer-implemented system, comprising:
input/output (I/O) circuitry;
access image data that comprises a plurality of macropixels, wherein the image data is generated using a device comprising a lenslet array;
control circuitry configured to:
decompose the image data into a plurality of components, each respective component comprising a first sub-component and a second sub-component, the decomposing comprising:
determining a first matrix corresponding to the first sub-component, wherein a size of the first matrix is determined based on the number of the plurality of macropixels included in the image data; and
determining a second matrix corresponding to the second sub-component, wherein a size of the second matrix is determined based on the dimensions of each of the plurality of micropixels;
encode each first sub-component using an image codec; and
encode each second sub-component using a second encoding technique corresponding to a fixed-length encoding;
wherein the I/O circuitry is further configured to:
transmit each encoded component of the plurality of components to cause display of reconstructed image data based on decoding each encoded component of the plurality of components.

12. The system of claim 11, wherein the control circuitry is further configured to determine each component of the plurality of components based on the number of the plurality of macropixels included in the image data and the dimensions of each of the plurality of macropixels.

13. The system of claim 11, wherein the first sub-component corresponds to a natural image representation of the image data, and the second sub-component corresponds to a weighting factor to be applied to the first sub-component.

14. The system of claim 11, wherein the control circuitry is further configured to:
prior to encoding the first sub-component, normalize the first sub-component using a set of normalization parameters; and
transmit each encoded component of the plurality of components by transmitting the set of normalization parameters.

15. The system of claim 11, wherein the control circuitry is further configured to:
decompose the image data into one or more additional components in addition to the plurality of components;
encode each of the one or more additional components;
transmit each encoded component of the plurality of components based on determining that current network conditions permit the transmitting of each encoded component of the plurality of components, but do not permit transmitting each of the one or more additional encoded components; and
in response to determining that the current network conditions have improved to permit transmission of the one or more additional encoded components, transmit the one or more additional encoded components.

16. The system of claim 11, wherein the control circuitry is further configured to:
decompose the image data into one or more additional components in addition to the plurality of components;
encode each of the one or more additional components;
after transmitting each encoded component of the plurality of components, receive a request for a higher-quality version of the image data; and
in response to receiving the request, transmit the one or more additional encoded components.

17. The system of claim 11, wherein:
the plurality of components corresponds to respective different frequency values associated with the image data; and
the control circuitry is further configured to transmit each encoded component of the plurality of components in a sequential order of ascending frequency values.

18. The system of claim 11, wherein:
the control circuitry is further configured to transmit to a client device each encoded component of the plurality of components;
the client device is configured to perform the decoding of each encoded component of the plurality of components, and generating for display the reconstructed image data; and
the reconstructed image data is generated for display by aggregating the plurality of components at the client device.

19. The system of claim 11, wherein the number of the plurality of macropixels is based on a first number of macropixels in a first direction of an image corresponding to the image data and a second number of macropixels in a second direction of the image, and wherein the first matrix comprises a number of columns corresponding to the first number of macropixels, and wherein the first matrix comprises a number of rows corresponding to the second number of macropixels.

20. The system of claim 11, wherein the dimensions of each of the plurality of macropixels is based on a first number of pixels in a first direction of a respective macropixel in an image corresponding to the image data and a second number of pixels in a second direction of the respective macropixel in the image, and wherein the second matrix comprises a number of columns corresponding to the first number of pixels, and wherein the second matrix comprises a number of row corresponding to the second number of pixels.

* * * * *